(12) United States Patent
Koike et al.

(10) Patent No.: US 12,112,770 B2
(45) Date of Patent: Oct. 8, 2024

(54) MAGNETIC TAPE CARTRIDGE, MAGNETIC TAPE DRIVE, TENSION CONTROL METHOD, METHOD OF HANDLING MAGNETIC TAPE, AND PROGRAM

(71) Applicant: FUJIFILM CORPORATION, Tokyo (JP)

(72) Inventors: Keisuke Koike, Kanagawa (JP); Ren Ishikawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/349,964

(22) Filed: Jul. 11, 2023

(65) Prior Publication Data

US 2024/0038269 A1 Feb. 1, 2024

(30) Foreign Application Priority Data

Jul. 29, 2022 (JP) ................. 2022-121979

(51) Int. Cl.
*G11B 23/04* (2006.01)
(52) U.S. Cl.
CPC ................. *G11B 23/042* (2013.01)
(58) Field of Classification Search
None
See application file for complete search history.

(56) References Cited

U.S. PATENT DOCUMENTS

| | | | |
|---|---|---|---|
| 6,545,834 B1 * | 4/2003 | Melbye ............... | G11B 15/43 360/71 |
| 2004/0129818 A1 * | 7/2004 | Sugawara .......... | G11B 15/43 |
| 2005/0077409 A1 | 4/2005 | Brown et al. | |
| 2005/0254161 A1 * | 11/2005 | Nakao ................ | G11B 15/026 |
| 2006/0043227 A1 * | 3/2006 | Iino ................... | G11B 23/037 242/348 |
| 2006/0072235 A1 * | 4/2006 | Kuse .................. | G11B 15/26 360/71 |
| 2006/0115688 A1 * | 6/2006 | Uchiumi ........... | G11B 5/73937 369/287 |
| 2008/0087760 A1 * | 4/2008 | Ishikawa ........... | B65H 75/14 242/610.4 |
| 2013/0188271 A1 * | 7/2013 | Fasen ................. | G11B 15/43 |
| 2014/0312154 A1 * | 10/2014 | Cherubini ......... | G11B 15/54 242/334 |
| 2020/0357434 A1 * | 11/2020 | Yamaga ............. | G11B 5/714 |
| 2021/0375318 A1 * | 12/2021 | Kasada .............. | G11B 5/714 |

(Continued)

FOREIGN PATENT DOCUMENTS

| | | | |
|---|---|---|---|
| JP | 2005-116163 A | 4/2005 | |
| JP | 6669302 B1 * | 3/2020 | ............ G11B 15/43 |

*Primary Examiner* — William J Klimowicz
(74) *Attorney, Agent, or Firm* — SOLARIS Intellectual Property Group, PLLC

(57) ABSTRACT

A magnetic tape cartridge includes a magnetic tape wound around a reel, in which the magnetic tape has a first region, which is a predetermined region influenced by a width change of the magnetic tape accompanied by deformation of the reel due to winding of the magnetic tape, and a second region, which is a region on an outer peripheral side of the reel with respect to the first region, and regarding a degree of elongation in a longitudinal direction of the magnetic tape, the degree of the first region is equal to or larger than the degree of the second region.

16 Claims, 23 Drawing Sheets

(56) References Cited

U.S. PATENT DOCUMENTS

| | | | |
|---|---|---|---|
| 2021/0375319 A1* | 12/2021 | Kasada | G11B 5/714 |
| 2021/0383830 A1* | 12/2021 | Kasada | G11B 5/736 |
| 2022/0172742 A1* | 6/2022 | Sekiguchi | G11B 23/107 |
| 2024/0005954 A1* | 1/2024 | Ishikawa | G11B 5/5508 |

* cited by examiner

FIG. 10
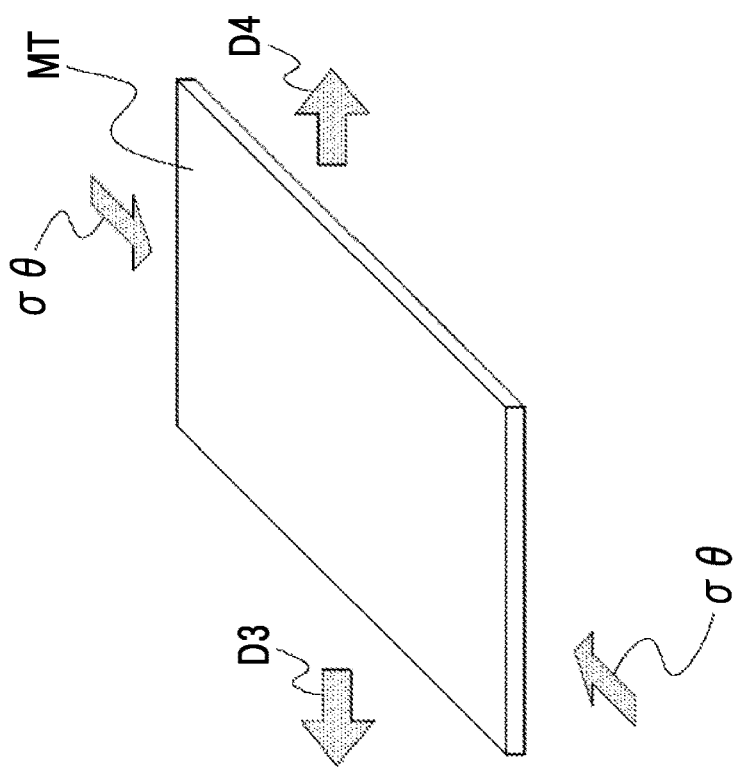
+
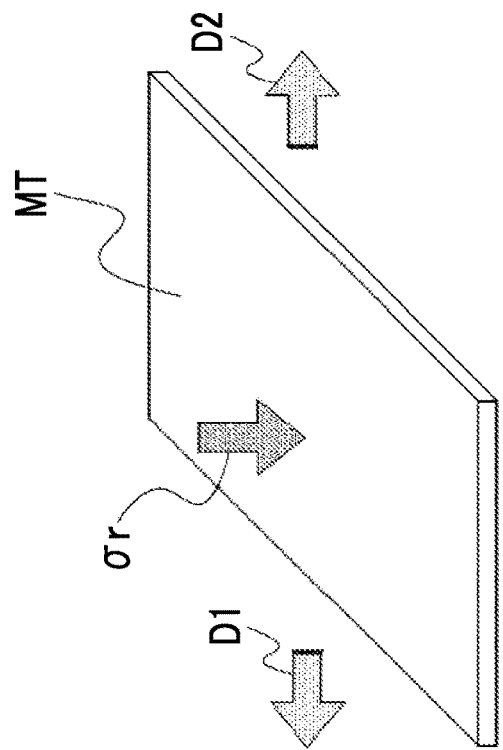

FIG. 11
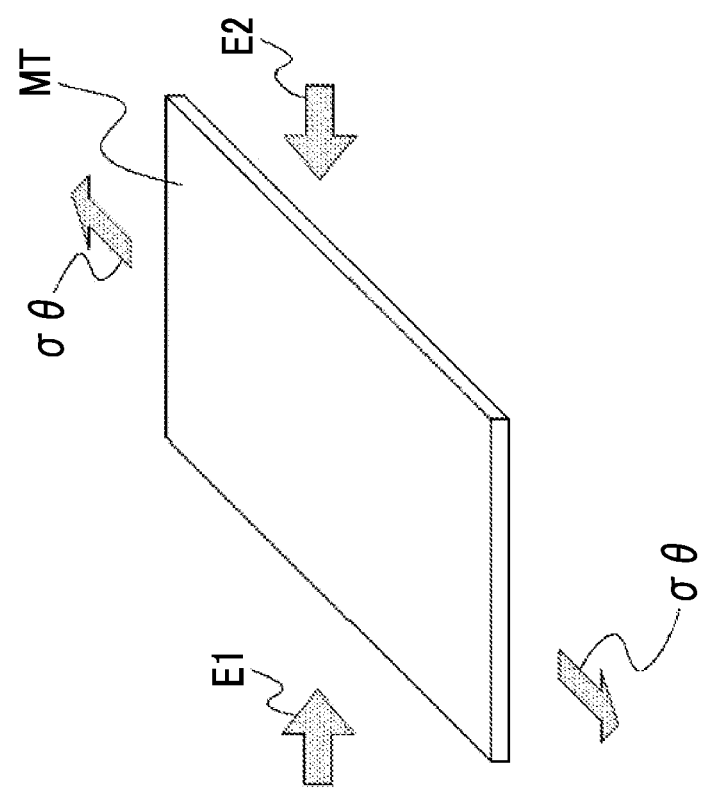
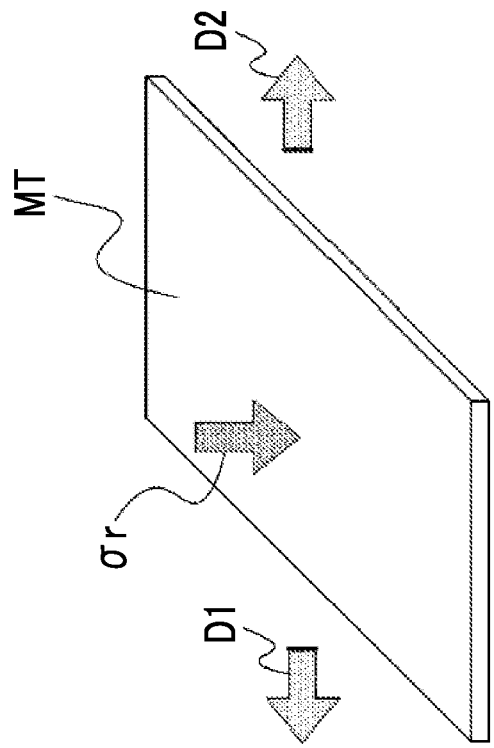

MAGNETIC TAPE CARTRIDGE, MAGNETIC TAPE DRIVE, TENSION CONTROL METHOD, METHOD OF HANDLING MAGNETIC TAPE, AND PROGRAM

CROSS-REFERENCE TO RELATED APPLICATION

This application claims priority from Japanese Patent Application No. 2022-121979, filed Jul. 29, 2022, the disclosure of which is incorporated herein by reference in its entirety.

BACKGROUND

Technical Field

The technology of the present disclosure relates to a magnetic tape cartridge, a magnetic tape drive, a tension control method, a method of handling a magnetic tape, and a non-transitory storage medium storing a program.

Related Art

JP2005-116163A discloses a tape reel assembly for winding and unwinding a storage tape having a hub defining an inner surface and a tape winding surface, in which at least a part of the hub is made of plastic, and the tape winding surface has an effective radial modulus greater than 2 GPa.

SUMMARY

One embodiment according to the technology of the present disclosure provides a magnetic tape cartridge, a magnetic tape drive, a tension control method, a method of handling a magnetic tape, and a program capable of suppressing deformation of a width of a magnetic tape.

A first aspect according to the technology of the present disclosure relates to a magnetic tape cartridge comprising a magnetic tape wound around a reel, in which the magnetic tape has a first region, which is a predetermined region influenced by a width change of the magnetic tape accompanied by deformation of the reel due to winding of the magnetic tape, and a second region, which is a region on an outer peripheral side of the reel with respect to the first region, and regarding a degree of elongation in a longitudinal direction of the magnetic tape, the degree of the first region is equal to or larger than the degree of the second region.

A second aspect according to the technology of the present disclosure relates to the magnetic tape cartridge according to the first aspect, in which the second region includes an intermediate region in the longitudinal direction of the magnetic tape.

A third aspect according to the technology of the present disclosure relates to the magnetic tape cartridge according to the first or second aspect, in which a plurality of servo patterns are formed in the magnetic tape in the longitudinal direction, and the degree is obtained based on a first interval, which is an interval between the servo patterns adjacent to each other in the longitudinal direction of the magnetic tape in the first region, and a second interval, which is an interval between the servo patterns adjacent to each other in the longitudinal direction of the magnetic tape in the second region.

A fourth aspect according to the technology of the present disclosure relates to the magnetic tape cartridge according to the third aspect, in which a value of the first interval is a statistic value of the intervals between the servo patterns adjacent to each other in the longitudinal direction of the magnetic tape in the first region.

A fifth aspect according to the technology of the present disclosure relates to the magnetic tape cartridge according to the third or fourth aspect, in which a value of the second interval is a statistic value of the intervals between the servo patterns adjacent to each other in the longitudinal direction of the magnetic tape in the second region.

A sixth aspect according to the technology of the present disclosure relates to a magnetic tape cartridge comprising a magnetic tape wound around a reel, in which the magnetic tape has a first region, which is a predetermined region influenced by a width change of the magnetic tape accompanied by deformation of the reel due to winding of the magnetic tape, and a degree of elongation in a longitudinal direction of the magnetic tape in the first region is larger after magnetic processing is performed on the magnetic tape than before the magnetic processing is performed.

A seventh aspect according to the technology of the present disclosure relates to a magnetic tape drive comprising a processor, and a tension application mechanism, in which the processor causes the tension application mechanism to apply a tension to the magnetic tape provided in the magnetic tape cartridge according to any one of the first to sixth aspects, and the tension is determined in accordance with the degree.

An eighth aspect according to the technology of the present disclosure relates to the magnetic tape drive according to the seventh aspect, in which the degree is determined in accordance with a longitudinal direction position of the magnetic tape.

A ninth aspect according to the technology of the present disclosure relates to the magnetic tape drive according to the eighth aspect, in which the degree is determined in accordance with a rate of change of the tension with respect to the longitudinal direction position of the magnetic tape.

A tenth aspect according to the technology of the present disclosure relates to the magnetic tape drive according to the seventh aspect, in which the processor acquires tension information related to the tension applied to the magnetic tape, and outputs the acquired tension information, and the tension information is information for changing a rate of change of the tension with respect to a longitudinal direction position of the magnetic tape in accordance with the longitudinal direction position of the magnetic tape.

An eleventh aspect according to the technology of the present disclosure relates to a tension control method of applying a tension to the magnetic tape provided in the magnetic tape cartridge according to any one of the first to sixth aspects, the method comprising changing the degree, and applying a tension corresponding to the changed degree to the magnetic tape.

A twelfth aspect according to the technology of the present disclosure relates to the tension control method according to the eleventh aspect, further comprising changing a rate of change of the tension with respect to a longitudinal direction position of the magnetic tape in accordance with the longitudinal direction position of the magnetic tape.

A thirteenth aspect according to the technology of the present disclosure relates to the tension control method according to the eleventh or twelfth aspect, in which the magnetic tape has a first region, which is a predetermined region influenced by a width change of the magnetic tape accompanied by deformation of the reel due to winding of the magnetic tape, and a second region, which is a region on an outer peripheral side of the reel with respect to the first region, and the rate of change in the first region is larger than the rate of change in the second region.

A fourteenth aspect according to the technology of the present disclosure relates to the tension control method according to any one of the eleventh to thirteenth aspects, in which the degree is non-linearly decreased from a core side to an outer peripheral side of the reel.

A fifteenth aspect according to the technology of the present disclosure relates to a method of handling a magnetic tape, the method comprising applying the tension to the magnetic tape in accordance with the tension control method according to any one of the eleventh to fourteenth aspects, and winding the magnetic tape to which the tension is applied around a reel.

A sixteenth aspect according to the technology of the present disclosure relates to the method of handling a magnetic tape according to the fifteenth aspect, the method further comprising sending the magnetic tape based on displacement of the tension used in a case in which the magnetic tape is wound around the reel.

A seventeenth aspect according to the technology of the present disclosure relates to a method of handling a magnetic tape, the method comprising transporting the magnetic tape in accordance with the tension control method according to any one of the eleventh to fourteenth aspects.

An eighteenth aspect according to the technology of the present disclosure relates to a non-transitory storage medium storing a program causing a computer to execute a process, which is a tension control process of applying a tension to the magnetic tape provided in the magnetic tape cartridge according to any one of the first to sixth aspects, the tension control process comprising changing the degree, and applying a tension corresponding to the changed degree to the magnetic tape.

BRIEF DESCRIPTION OF THE DRAWINGS

FIG. 10 is a conceptual diagram showing an example of a width change of the magnetic tape due to the stress generated in the magnetic tape as a comparative example.

FIG. 11 is a conceptual diagram showing an example of the width change of the magnetic tape due to the stress generated in the magnetic tape according to the embodiment.

DETAILED DESCRIPTION

Hereinafter, an example of embodiments of a magnetic tape cartridge, a magnetic tape drive, and a tension control method, a method of handling a magnetic tape, and a non-transitory storage medium storing a program according to the technology of the present disclosure will be described with reference to the accompanying drawings.

First, the terms used in the following description will be described.

NVM refers to an abbreviation of "non-volatile memory".
CPU refers to an abbreviation of "central processing unit".

GPU refers to an abbreviation of "graphics processing unit". RAM refers to an abbreviation of "random access memory". EEPROM refers to an abbreviation of "electrically erasable and programmable read only memory". SSD refers to an abbreviation of "solid state drive". HDD refers to an abbreviation of "hard disk drive". ASIC refers to an abbreviation of "application specific integrated circuit". FPGA refers to an abbreviation of "field-programmable gate array". PLC refers to an abbreviation of "programmable logic controller". IC refers to an abbreviation of "integrated circuit". RFID refers to an abbreviation of "radio frequency identifier". BOT refers to an abbreviation of "beginning of tape". EOT refers to an abbreviation of "end of tape". UI refers to an abbreviation of "user interface". WAN refers to an abbreviation of "wide area network". LAN refers to an abbreviation of "local area network". PES refers to an abbreviation of "position error signal".

First Embodiment

Figure 1:
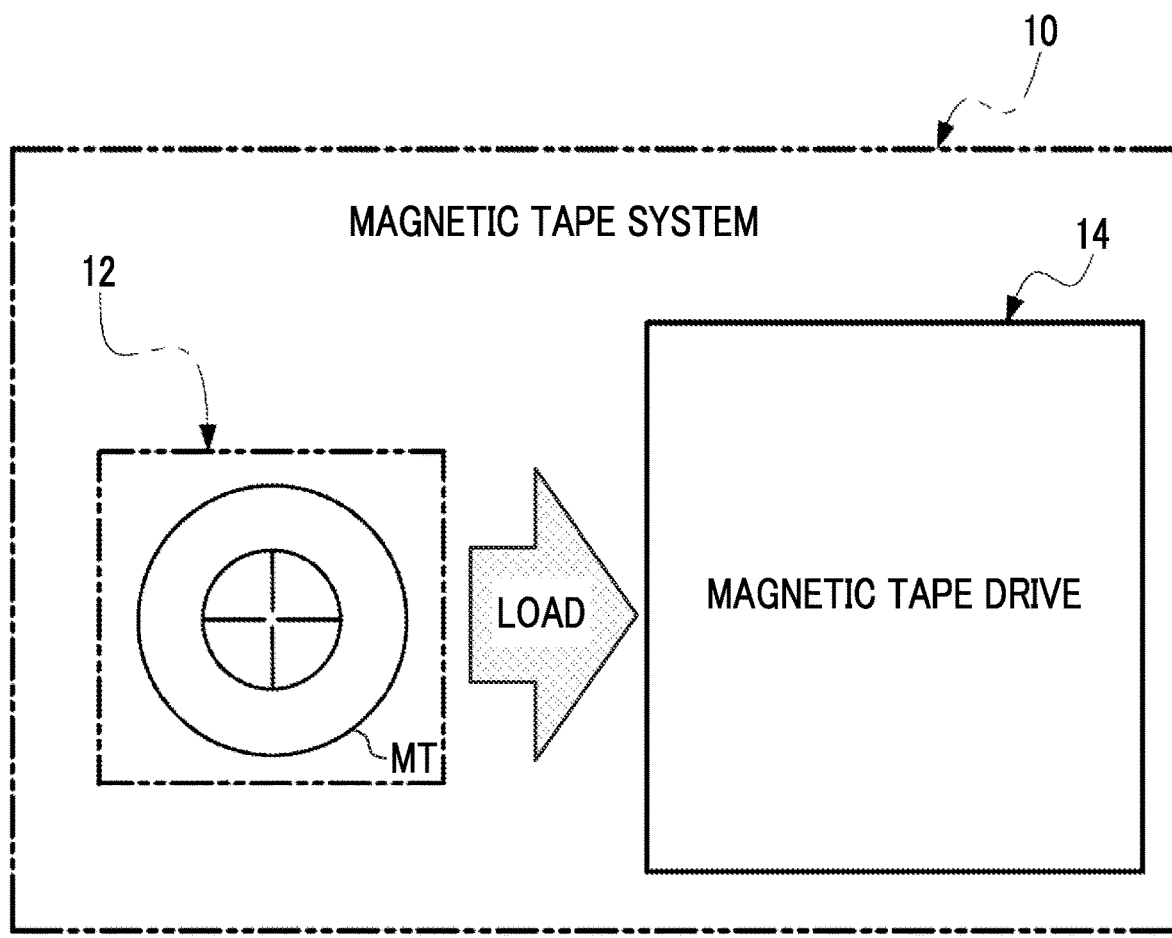
FIG. 1 is a block diagram showing an example of a configuration of a magnetic tape system according to an embodiment.

As an example, as shown in FIG. 1, a magnetic tape system 10 comprises a magnetic tape cartridge 12 and a magnetic tape drive 14. A magnetic tape cartridge 12 is loaded into the magnetic tape drive 14. The magnetic tape cartridge 12 accommodates a magnetic tape MT. The magnetic tape drive 14 pulls out the magnetic tape MT from the loaded magnetic tape cartridge 12, and records data in the magnetic tape MT and reads data from the magnetic tape MT while causing the pulled out magnetic tape MT to travel.

In the present embodiment, the magnetic tape MT is an example of a "magnetic tape" according to the technology of the present disclosure. In addition, in the present embodiment, the magnetic tape drive 14 is an example of a "magnetic tape drive" according to the technology of the present disclosure. In addition, in the present embodiment, the magnetic tape cartridge 12 is an example of a "magnetic tape cartridge" according to the technology of the present disclosure.

Next, an example of a configuration of the magnetic tape cartridge 12 will be described with reference to FIG. 2. It should be noted that, in the following description, for convenience of description, in FIG. 2, a loading direction of the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the following description of the structure, "front" refers to the front side of the magnetic tape cartridge 12.

In addition, in the following description, for convenience of description, in FIG. 2, a direction of an arrow B orthogonal to the direction of the arrow A is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following description, for convenience of description, in FIG. 2, a direction opposite to the direction of the arrow B is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following description, for convenience of description, in FIG. 2, a direction orthogonal to the direction of the arrow A and the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, in FIG. 2, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, in FIG. 2, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

Figure 2:
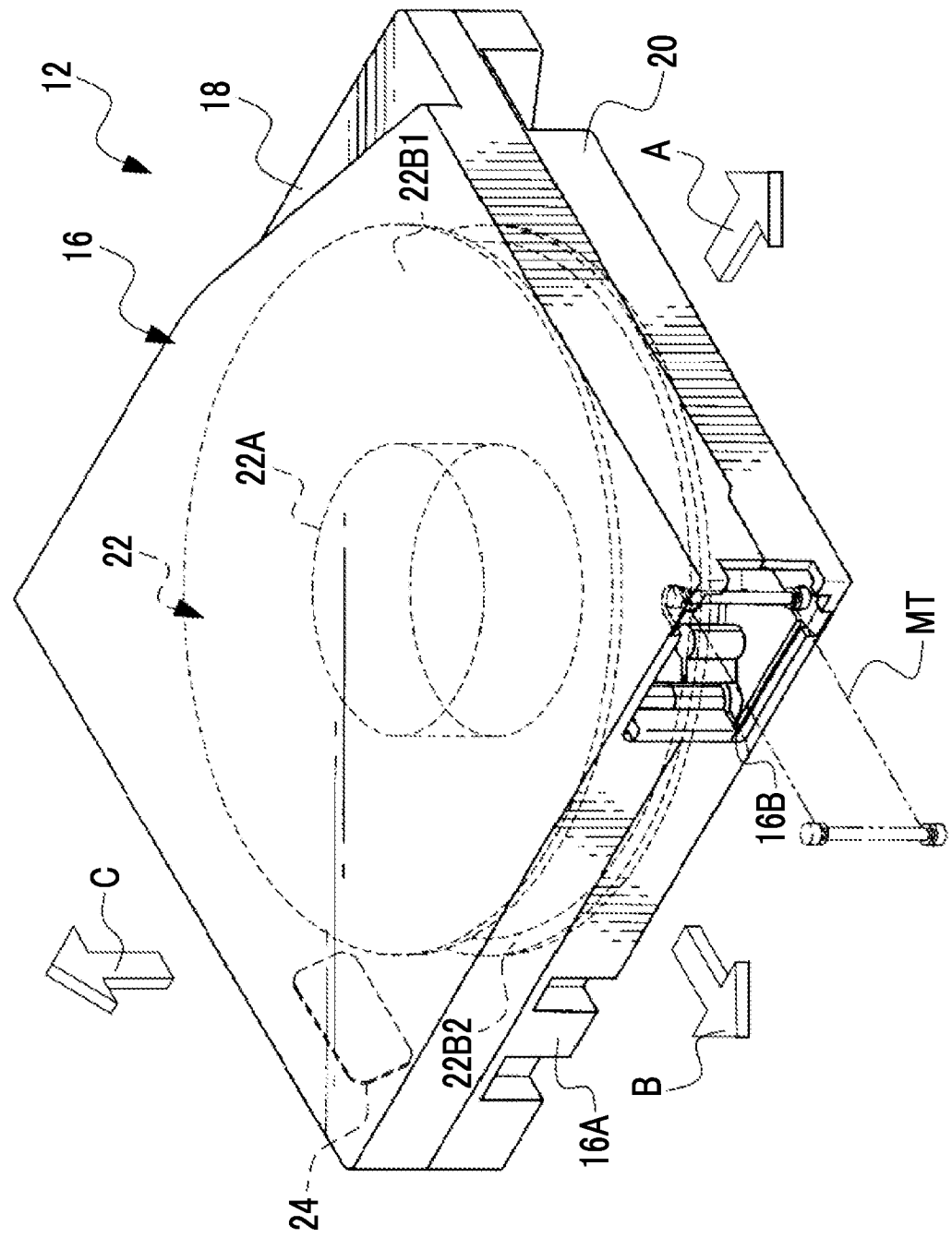
FIG. 2 is a schematic perspective view of an example of an appearance of a magnetic tape cartridge according to the embodiment.

As an example, as shown in FIG. 2, the magnetic tape cartridge 12 has a substantially rectangular shape in a plan view, and comprises a box-shaped case 16. The magnetic tape MT is accommodated in the case 16. The case 16 is made of resin, such as polycarbonate, and comprises an upper case 18 and a lower case 20. The upper case 18 and the lower case 20 are bonded by welding (for example, ultrasound welding) and screwing in a state in which a lower peripheral edge surface of the upper case 18 and an upper peripheral edge surface of the lower case 20 are brought into contact with each other. The bonding method is not limited to welding and screwing, and other bonding methods may be used.

Inside the case 16, a cartridge reel 22 is rotatably accommodated. The cartridge reel 22 is an example of a "reel" according to the technology of the present disclosure. The cartridge reel 22 comprises a reel hub 22A, an upper flange 22B1, and a lower flange 22B2. The reel hub 22A is formed in a cylindrical shape. The reel hub 22A is an axial center portion of the cartridge reel 22, has an axial center direction along an up-down direction of the case 16, and is disposed in a center portion of the case 16. Each of the upper flange 22B1 and the lower flange 22B2 is formed in an annular shape. A center portion of the upper flange 22B1 in a plan view is fixed to an upper end portion of the reel hub 22A, and a center portion of the lower flange 22B2 in a plan view is fixed to a lower end portion of the reel hub 22A. It should be noted that the reel hub 22A and the lower flange 22B2 may be integrally molded.

The magnetic tape MT is wound around an outer peripheral surface of the reel hub 22A, and an end portion of the magnetic tape MT in a width direction is held by the upper flange 22B1 and the lower flange 22B2.

An opening 16B is formed on a front side of a right wall 16A of the case 16. The magnetic tape MT is pulled out from the opening 16B.

A cartridge memory 24 is provided in the lower case 20. Specifically, the cartridge memory 24 is accommodated in a right rear end portion of the lower case 20. An IC chip including an NVM is mounted on the cartridge memory 24. In the present embodiment, a so-called passive RFID tag is adopted as the cartridge memory 24, and the read/write of various pieces of information is performed with respect to the cartridge memory 24 in a noncontact manner.

The cartridge memory 24 stores management information for managing the magnetic tape cartridge 12. Examples of the management information include information on the cartridge memory 24 (for example, information for specifying the magnetic tape cartridge 12), information on the magnetic tape MT (for example, information indicating a recording capacity of the magnetic tape MT, information indicating an outline of the data recorded in the magnetic tape MT, information indicating items of the data recorded in the magnetic tape MT, and information indicating a recording format of the data recorded in the magnetic tape MT), and information on the magnetic tape drive 14 (for example, information indicating a specification of the magnetic tape drive 14 and a signal used in the magnetic tape drive 14).

Figure 3:
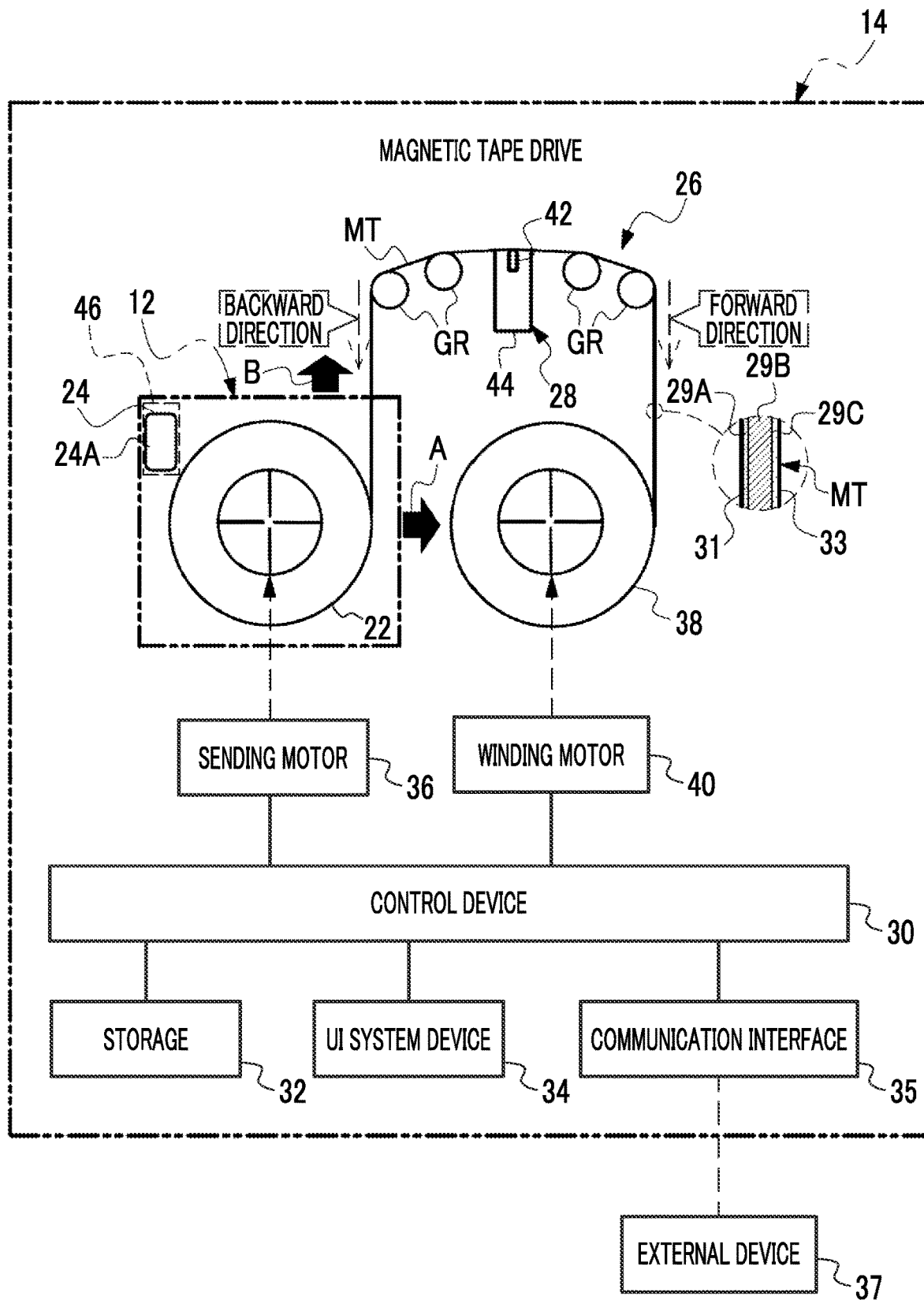
FIG. 3 is a schematic configuration diagram showing an example of a hardware configuration of a magnetic tape drive according to the embodiment.

As an example, as shown in FIG. 3, the magnetic tape drive 14 comprises a transport device 26, a magnetic head 28, a control device 30, a storage 32, a UI system device 34, and a communication interface 35. The magnetic tape drive 14 is loaded into the magnetic tape cartridge 12 along the direction of the arrow A. In the magnetic tape drive 14, the magnetic tape MT is pulled out from the magnetic tape cartridge 12 and used.

The magnetic tape MT has a magnetic layer 29A, a base film 29B, and a back coating layer 29C. The magnetic layer 29A is formed on one surface side of the base film 29B, and the back coating layer 29C is formed on the other surface side of the base film 29B. The data is recorded in the magnetic layer 29A. The magnetic layer 29A contains ferromagnetic powder. As the ferromagnetic powder, for example, ferromagnetic powder generally used in the magnetic layer of various magnetic recording media is used. Preferable specific examples of the ferromagnetic powder include hexagonal ferrite powder. Examples of the hexagonal ferrite powder include hexagonal strontium ferrite powder and hexagonal barium ferrite powder. The back coating layer 29C is a layer containing non-magnetic powder, such as carbon black. The base film 29B is also referred to as a support, and is made of, for example, polyethylene terephthalate, polyethylene naphthalate, or polyamide. It should be noted that a non-magnetic layer may be formed between the base film 29B and the magnetic layer 29A. In the magnetic tape MT, a surface on which the magnetic layer 29A is formed is a front surface 31 of the magnetic tape MT, and a surface on which the back coating layer 29C is formed is a back surface 33 of the magnetic tape MT.

The magnetic tape drive 14 performs magnetic processing on the front surface 31 of the magnetic tape MT by using the magnetic head 28. Here, the magnetic processing refers to recording the data in the front surface 31 of the magnetic tape MT and reading the data (that is, reproducing the data) from the front surface 31 of the magnetic tape MT. In the present embodiment, the magnetic tape drive 14 selectively records the data in the front surface 31 of the magnetic tape MT and reads the data from the front surface 31 of the magnetic tape MT by using the magnetic head 28. That is, the magnetic tape drive 14 pulls out the magnetic tape MT from the magnetic tape cartridge 12, records the data in the front surface 31 of the pulled out magnetic tape MT by using the magnetic head 28, or reads the data from the front surface 31 of the pulled out magnetic tape MT by using the magnetic head 28.

The control device 30 controls the entire magnetic tape drive 14. The storage 32 is connected to the control device 30, and the control device 30 writes various pieces of information to the storage 32 and reads out various pieces of information from the storage 32. Examples of the storage 32 include a flash memory and/or an HDD. The flash memory and the HDD are merely examples, and any memory may be used as long as the memory is a non-volatile memory that can be mounted on the magnetic tape drive 14.

The UI system device 34 is a device having the reception function of receiving a command signal indicating a command from a user and the presentation function of presenting the information to the user. The reception function is realized by a touch panel, a hard key (for example, a keyboard), and/or a mouse, for example. The presentation function is realized by a display, a printer, and/or a speaker, for example. The UI system device 34 is connected to the control device 30. The control device 30 acquires the command signal received by the UI system device 34. The UI system device 34 presents various pieces of information to the user under the control of the control device 30.

The communication interface 35 is connected to the control device 30. In addition, the communication interface 35 is connected to an external device 37 via a communication network (not shown), such as a WAN and/or a LAN. The communication interface 35 controls the exchange of various pieces of information (for example, the data to be recorded in the magnetic tape MT, the data read from the magnetic tape MT, and/or a command signal given to the control device 30) between the control device 30 and the external device 37. It should be noted that examples of the external device 37 include a personal computer and a mainframe.

The transport device 26 is a device that selectively transports the magnetic tape MT along a predetermined path in a forward direction and a backward direction, and comprises a sending motor 36, a winding reel 38, a winding motor 40, and a plurality of guide rollers GR. It should be noted that, here, the forward direction refers to a sending direction of the magnetic tape MT, and the backward direction refers to a rewinding direction of the magnetic tape MT.

The sending motor 36 rotates the cartridge reel 22 in the magnetic tape cartridge 12 under the control of the control device 30. The control device 30 controls the sending motor 36 to control a rotation direction, a rotation speed, a rotation torque, and the like of the cartridge reel 22.

The winding motor 40 rotates the winding reel 38 under the control of the control device 30. The control device 30 controls the winding motor 40 to control a rotation direction, a rotation speed, a rotation torque, and the like of the winding reel 38.

In a case in which the magnetic tape MT is wound by the winding reel 38, the control device 30 rotates the sending motor 36 and the winding motor 40 such that the magnetic tape MT travels along the predetermined path in the forward direction. The rotation speed, the rotation torque, and the like of the sending motor 36 and the winding motor 40 are adjusted in accordance with a speed at which the magnetic tape MT is wound around the winding reel 38. In addition, by adjusting the rotation speed, the rotation torque, and the like of each of the sending motor 36 and the winding motor 40 by the control device 30, the tension is applied to the magnetic tape MT. In addition, the tension applied to the magnetic tape MT is controlled by adjusting the rotation speed, the rotation torque, and the like of each of the sending motor 36 and the winding motor 40 by the control device 30. The sending motor 36 and the winding motor 40 are examples of a "tension application mechanism" according to the technology of the present disclosure.

It should be noted that, in a case in which the magnetic tape MT is rewound to the cartridge reel 22, the control device 30 rotates the sending motor 36 and the winding motor 40 such that the magnetic tape MT travels along the predetermined path in the backward direction.

In the present embodiment, the tension applied to the magnetic tape MT is controlled by controlling the rotation speed, the rotation torque, and the like of the sending motor 36 and the winding motor 40, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller which guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 to come into contact with the traveling magnetic tape MT. The magnetic element unit 42 includes a plurality of magnetic elements.

The magnetic element unit 42 records the data in the magnetic tape MT transported by the transport device 26, and reads the data from the magnetic tape MT transported by the transport device 26. Here, the data refers to, for example, a servo pattern 58 (see FIG. 7) and the data other than the servo pattern 58, that is, the data recorded in a data band DB (see FIG. 7).

The magnetic tape drive 14 comprises a noncontact read device 46. The noncontact read device 46 is disposed to face a back surface 24A of the cartridge memory 24 on the lower side of the magnetic tape cartridge 12 in a state in which the magnetic tape cartridge 12 is loaded, and performs the read/write of the information with respect to the cartridge memory 24 in a noncontact manner.

Figure 4:
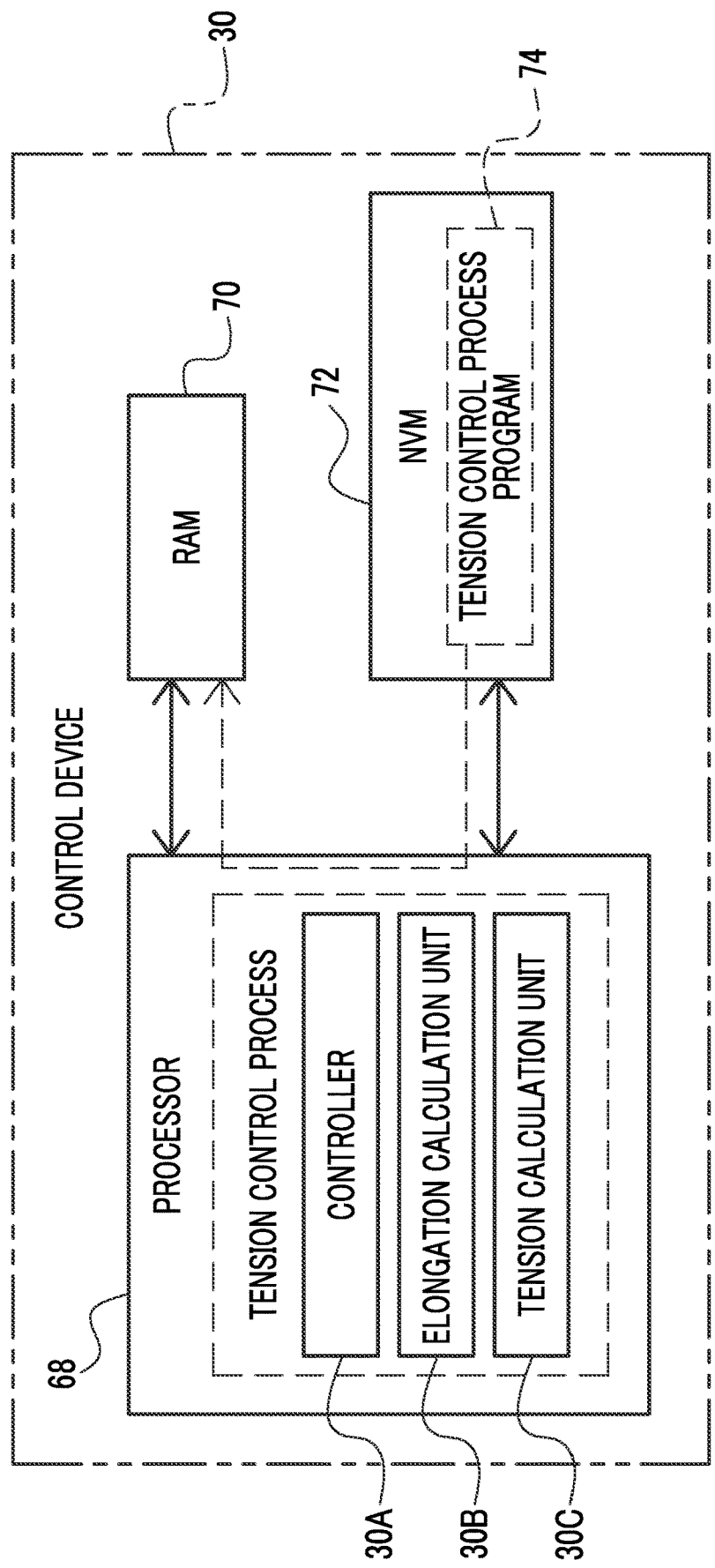
FIG. 4 is a functional block diagram showing an example of a main function of a processor of the magnetic tape drive according to the embodiment.

As shown in FIG. 4 as an example, the control device 30 comprises a processor 68, a RAM 70, and an NVM 72, and the processor 68, the RAM 70, and the NVM 72 are electrically connected to each other. The processor 68 is an example of a "processor" according to the technology of the present disclosure.

For example, the processor 68 includes a CPU and a GPU, and controls the entire control device 30. The GPU is operated under the control of the CPU and is responsible for execution of various types of graphic-related processing. It should be noted that, the processor 68 may be one or more CPUs integrated with GPU functions, or may be one or more CPUs which is not integrated with the GPU functions.

The RAM 70 is a memory in which the information is transitorily stored, and is used as a work memory by the processor 68. The NVM 72 is a non-volatile storage device that stores various programs, various parameters, and the like. Examples of the NVM 72 is a flash memory (for example, an EEPROM and/or an SSD). It should be noted that the flash memory is merely an example, and may be another non-volatile storage device, such as an HDD, or may be a combination of two or more types of non-volatile storage devices.

In the present embodiment, a tension control process is performed by the processor 68 of the control device 30. A tension control process program 74 is stored in the NVM 72. The processor 68 reads out the tension control process program 74 from the NVM 72, and executes the read out tension control process program 74 on the RAM 70. The tension control process is realized by the processor 68 being operated as a controller 30A, an elongation calculation unit 30B, and a tension calculation unit 30C in accordance with the tension control process program 74 executed on the RAM 70.

In the present embodiment, the control device 30 is realized by the computer including the processor, the NVM, and the RAM, but the technology of the present disclosure is not limited to this. For example, the control device 30 may be realized by an ASIC. Also, the control device 30 may be realized by an FPGA and/or a PLC. In addition, the control device 30 may be realized by combining two or more of an ASIC, an FPGA, a PLC, and a computer. That is, the control device 30 may be realized by a combination of a hardware configuration and a software configuration.

Figure 5:
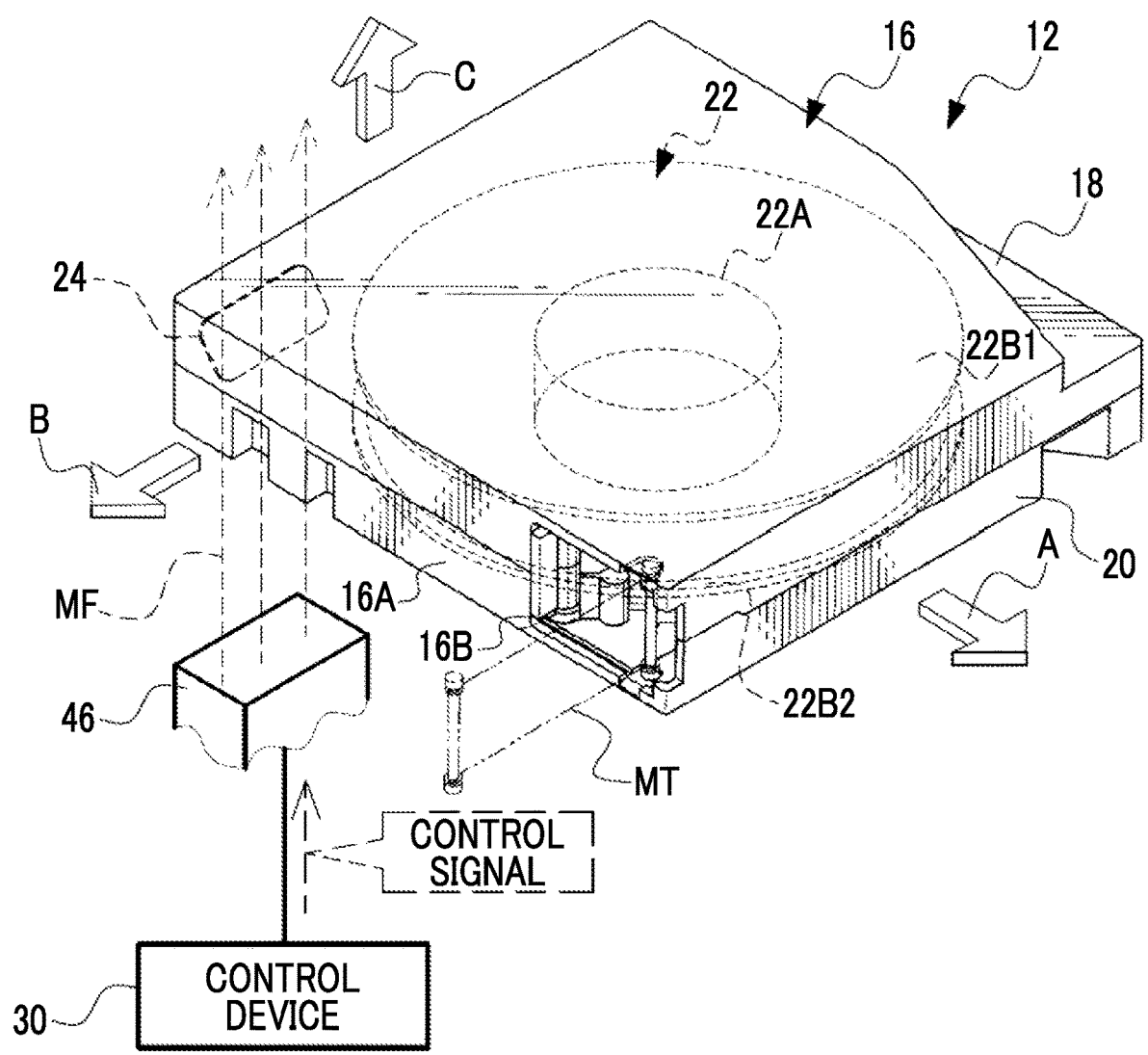
FIG. 5 is a schematic perspective view showing an example of an aspect in which a magnetic field is released by a noncontact read device from a lower side of the magnetic tape cartridge according to the embodiment.

As an example, as shown in FIG. 5, the noncontact read device 46 releases a magnetic field MF from the lower side of the magnetic tape cartridge 12 toward the cartridge memory 24. The magnetic field MF passes through the cartridge memory 24.

The noncontact read device 46 is connected to the control device 30. The control device 30 outputs a control signal to the noncontact read device 46. The control signal is a signal for controlling the cartridge memory 24. The noncontact read device 46 generates the magnetic field MF in response to the control signal input from the control device 30, and releases the generated magnetic field MF toward the cartridge memory 24.

The noncontact read device 46 performs noncontact communication with the cartridge memory 24 via the magnetic field MF to perform processing on the cartridge memory 24 in response to the control signal. For example, the noncontact read device 46 selectively performs, under the control of the control device 30, processing of reading the information from the cartridge memory 24 and processing of storing the information in the cartridge memory 24 (that is, processing of writing the information to the cartridge memory 24).

Figure 6:
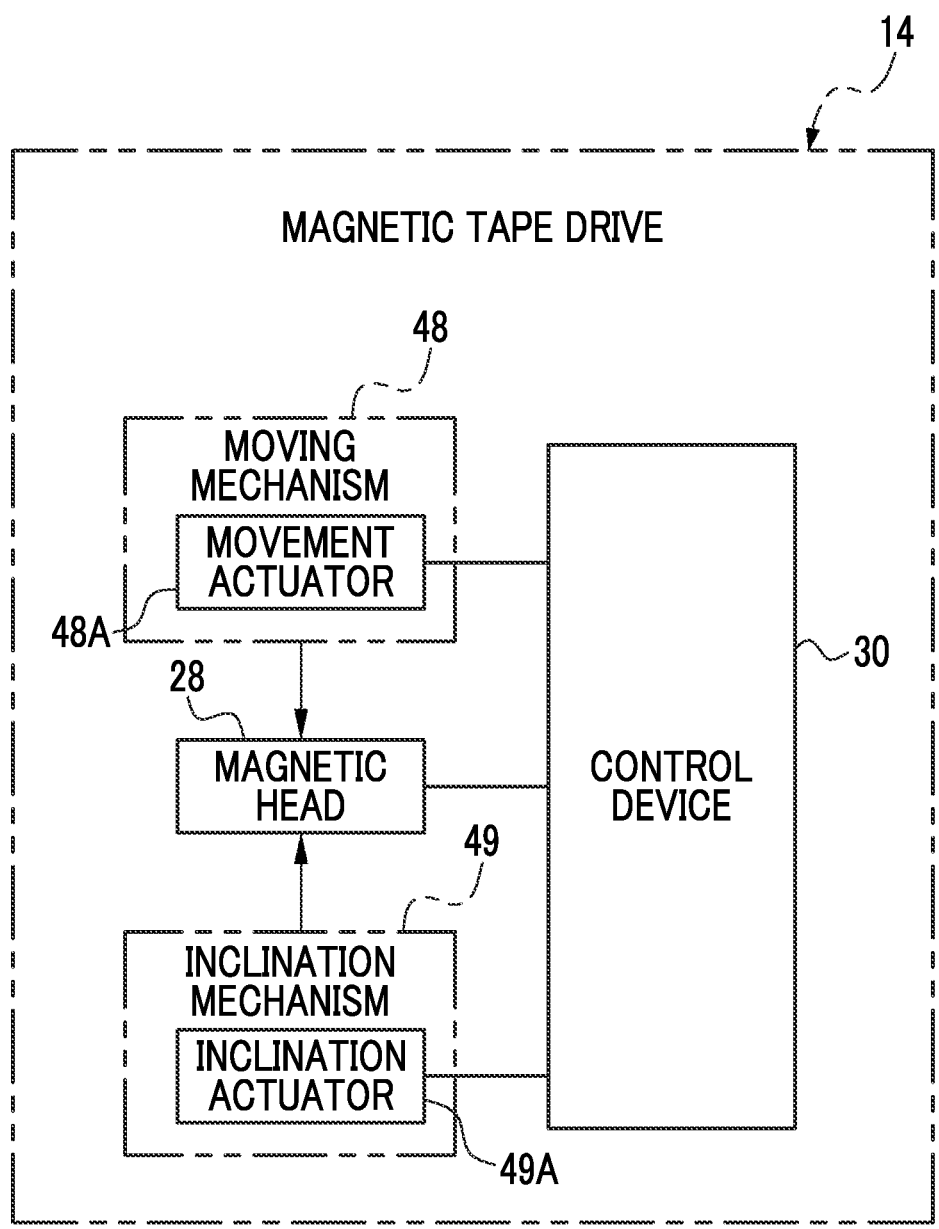
FIG. 6 is a schematic configuration diagram showing an example of the hardware configuration of the magnetic tape drive according to the embodiment.

As an example, as shown in FIG. 6, the magnetic tape drive 14 comprises a moving mechanism 48. The moving mechanism 48 includes a movement actuator 48A. Examples of the movement actuator 48A include a voice coil motor and/or a piezo actuator. The movement actuator 48A is connected to the control device 30, and the control device 30 controls the movement actuator 48A. The movement actuator 48A generates power under the control of the control device 30. The moving mechanism 48 moves the magnetic head 28 in a width direction of the magnetic tape MT by receiving the power generated by the movement actuator 48A.

The magnetic tape drive 14 comprises an inclination mechanism 49. The inclination mechanism 49 includes an inclination actuator 49A. Examples of the inclination actuator 49A include a voice coil motor and/or a piezo actuator. The inclination actuator 49A is connected to the control device 30, and the control device 30 controls the inclination actuator 49A. The inclination actuator 49A generates power under the control of the control device 30. The inclination mechanism 49 inclines the magnetic head 28 to a longitudinal direction LD side of the magnetic tape MT with respect to a width direction WD by receiving the power generated by the inclination actuator 49A. That is, the magnetic head 28 is skewed on the magnetic tape MT under the control of the control device 30.

Figure 7:
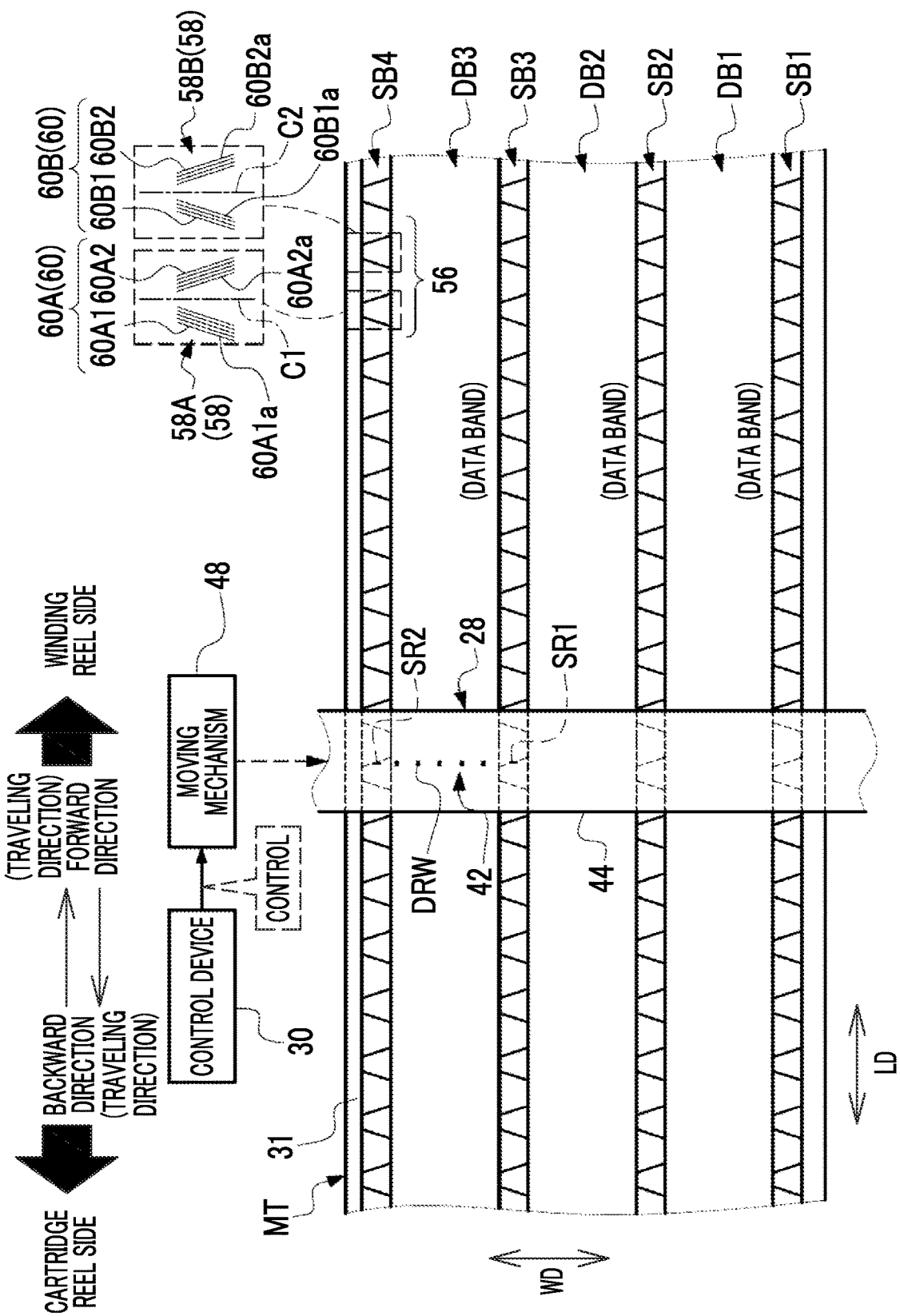
FIG. 7 is a conceptual diagram showing an example of an aspect in which a magnetic tape according to the embodiment is observed from a front surface side of the magnetic tape.

As an example, as shown in FIG. 7, on the front surface 31 of the magnetic tape MT, servo bands SB1, SB2, SB3, and SB4 are data bands DB1, DB2, and DB3 are formed. It should be noted that, in the following, for convenience of description, in a case in which the distinction is not specifically needed, the servo bands SB1 to SB4 are referred to as a servo band SB, and the data bands DB1 to DB3 are referred to as the data band DB.

The servo bands SB1 to SB4 and the data bands DB1 to DB3 are formed along the longitudinal direction LD (that is, a total length direction) of the magnetic tape MT. Here, the longitudinal direction LD of the magnetic tape MT refers to the traveling direction of the magnetic tape MT, in other words. The traveling direction of the magnetic tape MT is defined in two directions of the forward direction which is a direction in which the magnetic tape MT travels from the cartridge reel 22 side to the winding reel 38 side (hereinafter, also simply referred to as "forward direction"), and the backward direction which is a direction in which the magnetic tape MT travels from the winding reel 38 side to the cartridge reel 22 side (hereinafter, also simply referred to as "backward direction").

The servo bands SB1 to SB4 are arranged at positions spaced in the width direction WD of the magnetic tape MT (hereinafter, also simply referred to as "width direction WD"). For example, the servo bands SB1 to SB4 are arranged at equal intervals along the width direction WD. It should be noted that, in the present embodiment, "equal interval" refers to the equal interval in the sense of including an error generally allowed in the technical field to which the technology of the present disclosure belongs, which is the error to the extent that it does not contradict the purpose of the technology of the present disclosure, in addition to the exact equal interval.

The data band DB1 is disposed between the servo band SB1 and the servo band SB2, and the data band DB2 is disposed between a servo band SB2 and a servo band SB3. The data band DB3 is disposed between the servo band SB3 and the servo band SB4. That is, the servo bands SB and the data bands DB are arranged alternately along the width direction WD.

It should be noted that, in the example shown in FIG. 7, for convenience of description, four servo bands SB and three data bands DB are shown, but these are merely examples, and two servo bands SB and one data band DB may be used, or three servo bands and two data bands may be used. In addition, the technology of the present disclosure is established even in a case in which five or more servo bands SB and four or more data bands DB are used.

A plurality of servo patterns 58 are recorded in the servo band SB along the longitudinal direction LD of the magnetic tape MT. The servo patterns 58 are classified into a servo pattern 58A and a servo pattern 58B. The plurality of servo patterns 58 are disposed at regular intervals along the longitudinal direction LD of the magnetic tape MT. It should be noted that, in the present embodiment, "regular" refers to the regularity in the sense of including an error generally allowed in the technical field to which the technology of the present disclosure belongs, which is the error to the extent that it does not contradict the purpose of the technology of the present disclosure, in addition to the exact regularity. The plurality of servo patterns 58 are an example of a "plurality of servo patterns" according to the technology of the present disclosure.

The servo band SB is divided by a plurality of frames 56 along the longitudinal direction LD of the magnetic tape MT. The frame 56 is defined by a set of servo patterns 58. In the example shown in FIG. 7, servo patterns 58A and 58B are shown as an example of the set of servo patterns 58. The servo patterns 58A and 58B are adjacent to each other along the longitudinal direction LD of the magnetic tape MT, and the servo pattern 58A is positioned on the upstream side in the forward direction and the servo pattern 58B is positioned on the downstream side in the forward direction in the frame 56.

The servo pattern 58 consists of a linear magnetization region pair 60. The linear magnetization region pair 60 is classified into a linear magnetization region pair 60A and a linear magnetization region pair 60B.

The servo pattern 58A consists of the linear magnetization region pair 60A. In the example shown in FIG. 7, linear magnetization regions 60A1 and 60A2 are shown as an example of the linear magnetization region pair 60A. Each of the linear magnetization regions 60A1 and 60A2 is a linearly magnetized region.

The linear magnetization regions 60A1 and 60A2 are inclined in opposite directions with respect to an imaginary straight line C1 which is an imaginary straight line along the width direction WD. In the example shown in FIG. 7, the linear magnetization regions 60A1 and 60A2 are inclined line-symmetrically with respect to the imaginary straight line C1. More specifically, the linear magnetization regions 60A1 and 60A2 are formed in a state of being not parallel to each other and being inclined at a predetermined angle (for example, 5 degrees) in opposite directions on the longitudinal direction LD side of the magnetic tape MT with the imaginary straight line C1 as the symmetry axis.

The linear magnetization region 60A1 is a set of magnetization straight lines 60A1a, which are five magnetized straight lines. The linear magnetization region 60A2 is a set of magnetization straight lines 60A2a, which are five magnetized straight lines.

The servo pattern 58B consists of the linear magnetization region pair 60B. In the example shown in FIG. 7, linear magnetization regions 60B1 and 60B2 are shown as an example of the linear magnetization region pair 60B. Each of the linear magnetization regions 60B1 and 60B2 is a linearly magnetized region.

The linear magnetization regions 60B1 and 60B2 are inclined in opposite directions with respect to an imaginary straight line C2 which is an imaginary straight line along the width direction WD. In the example shown in FIG. 7, the linear magnetization regions 60B1 and 60B2 are inclined line-symmetrically with respect to the imaginary straight line C2. More specifically, the linear magnetization regions 60B1 and 60B2 are formed in a state of being not parallel to each other and being inclined at a predetermined angle (for example, 5 degrees) in opposite directions on the longitudinal direction LD side of the magnetic tape MT with the imaginary straight line C2 as the symmetry axis.

The linear magnetization region 60B1 is a set of magnetization straight lines 60B1a, which are four magnetized straight lines. The linear magnetization region 60B2 is a set of magnetization straight lines 60B2a, which are four magnetized straight lines.

The magnetic head 28 is disposed on the front surface 31 side of the magnetic tape MT configured as described above. The holder 44 is formed in a rectangular parallelepiped shape, and is disposed to cross the front surface 31 of the magnetic tape MT along the width direction WD. The plurality of magnetic elements of the magnetic element unit 42 are arranged in a straight line along the longitudinal direction LD of the holder 44. The magnetic element unit 42 has a pair of servo reading elements SR and a plurality of data read/write elements DRW as the plurality of magnetic elements. A length of the holder 44 in the longitudinal direction is sufficiently long with respect to the width of the magnetic tape MT. For example, the length of the holder 44 in the longitudinal direction is set to a length exceeding the width of the magnetic tape MT even in a case in which the magnetic element unit 42 is disposed at any position on the magnetic tape MT.

The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 7, the servo reading element SR1 is provided at a position corresponding to the servo band SB3, and the servo reading element SR2 is provided at a position corresponding to the servo band SB4.

The plurality of data read/write elements DRW are disposed in a straight line between the servo reading element SR1 and the servo reading element SR2. The plurality of data read/write elements DRW are disposed at intervals along the longitudinal direction of the magnetic head 28 (for example, are disposed at equal intervals along the longitudinal direction of the magnetic head 28). In the example shown in FIG. 7, the plurality of data read/write elements DRW are provided at positions corresponding to the data band DB3.

The control device 30 acquires a servo signal which is a result of reading the servo pattern 58 by the servo reading element SR, and performs a servo control in response to the acquired servo signal. Here, the servo control refers to a control of moving the magnetic head 28 in the width direction WD of the magnetic tape MT by operating the moving mechanism 48 in accordance with the servo pattern 58 read by the servo reading element SR.

By performing the servo control, the plurality of data read/write elements DRW are positioned on a designated region in the data band DB, and perform the magnetic processing on the designated region in the data band DB. In the example shown in FIG. 7, the plurality of data read/write elements DRW perform the magnetic processing on the designated region in the data band DB3.

In addition, in a case in which the data band DB of which the data is to be read by the magnetic element unit 42 is changed (in the example shown in FIG. 7, the data band DB of which the data is to be read by the magnetic element unit 42 is changed from the data band DB3 to the data band DB2), the moving mechanism 48 moves, under the control of the control device 30, the magnetic head 28 in the width direction WD to change the position of the pair of servo reading elements SR. That is, by moving the magnetic head 28 in the width direction WD, the moving mechanism 48 moves the servo reading element SR1 to a position corresponding to the servo band SB2 and moves the servo reading element SR2 to the position corresponding to the servo band SB3. As a result, the positions of the plurality of data read/write elements DRW are changed from the data band DB3 to the data band DB2, and the plurality of data read/write elements DRW perform the magnetic processing on the data band DB2.

Moreover, the same control is also performed in a case in which the data band DB of which the data is to be read by the magnetic element unit 42 is changed from the data band DB2 to the data band DB1. Also, the same control is also performed in a case in which the data band DB of which the data is to be read by the magnetic element unit 42 is changed from the data band DB1 to the data band DB3.

Figure 8:
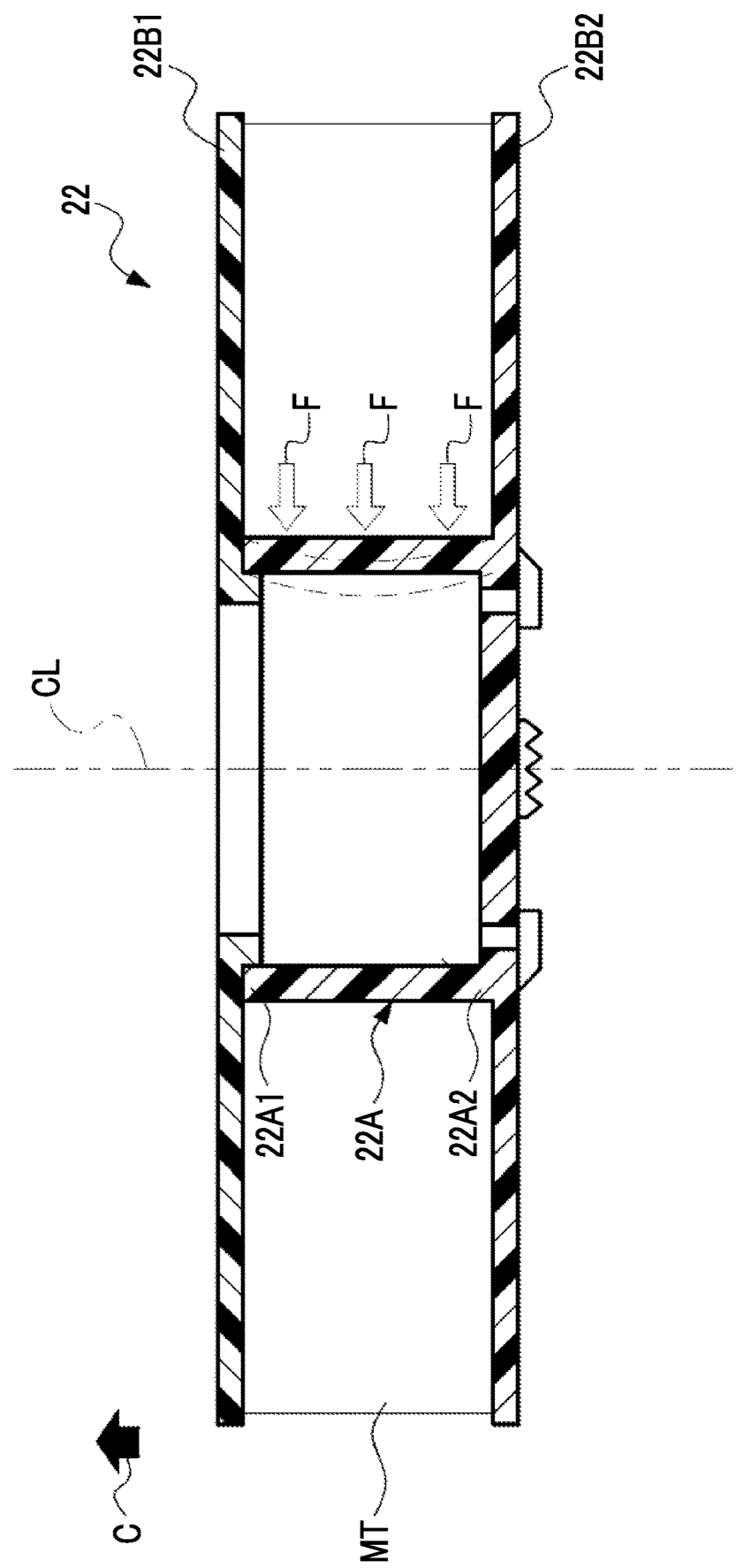
FIG. 8 is a cross-sectional view showing an example of a schematic configuration of a cartridge reel according to the embodiment.

As shown in FIG. 8 as an example, the magnetic tape MT is wound around an outer periphery of the reel hub 22A. By fastening with the magnetic tape MT, a load F is applied to the reel hub 22A from the magnetic tape MT. An upper flange 22B1 and a lower flange 22B2 are provided on the reel hub 22A, respectively. As a result, an upper end portion 22A1 and a lower end portion 22A2 of the reel hub 22A have larger rigidity (for example, bending rigidity) than the central portion of the reel hub 22A in the up-down direction. The reason is that the upper flange 22B1 and the lower flange 22B2 that are continuous in a circumferential direction function as support members for the reel hub 22A and contribute to the improvement of the rigidity. As a result, contraction deformation is generated between the upper end portion 22A1 and the lower end portion 22A2 of the reel hub 22A due to the fastening with the magnetic tape MT.

Figure 9:
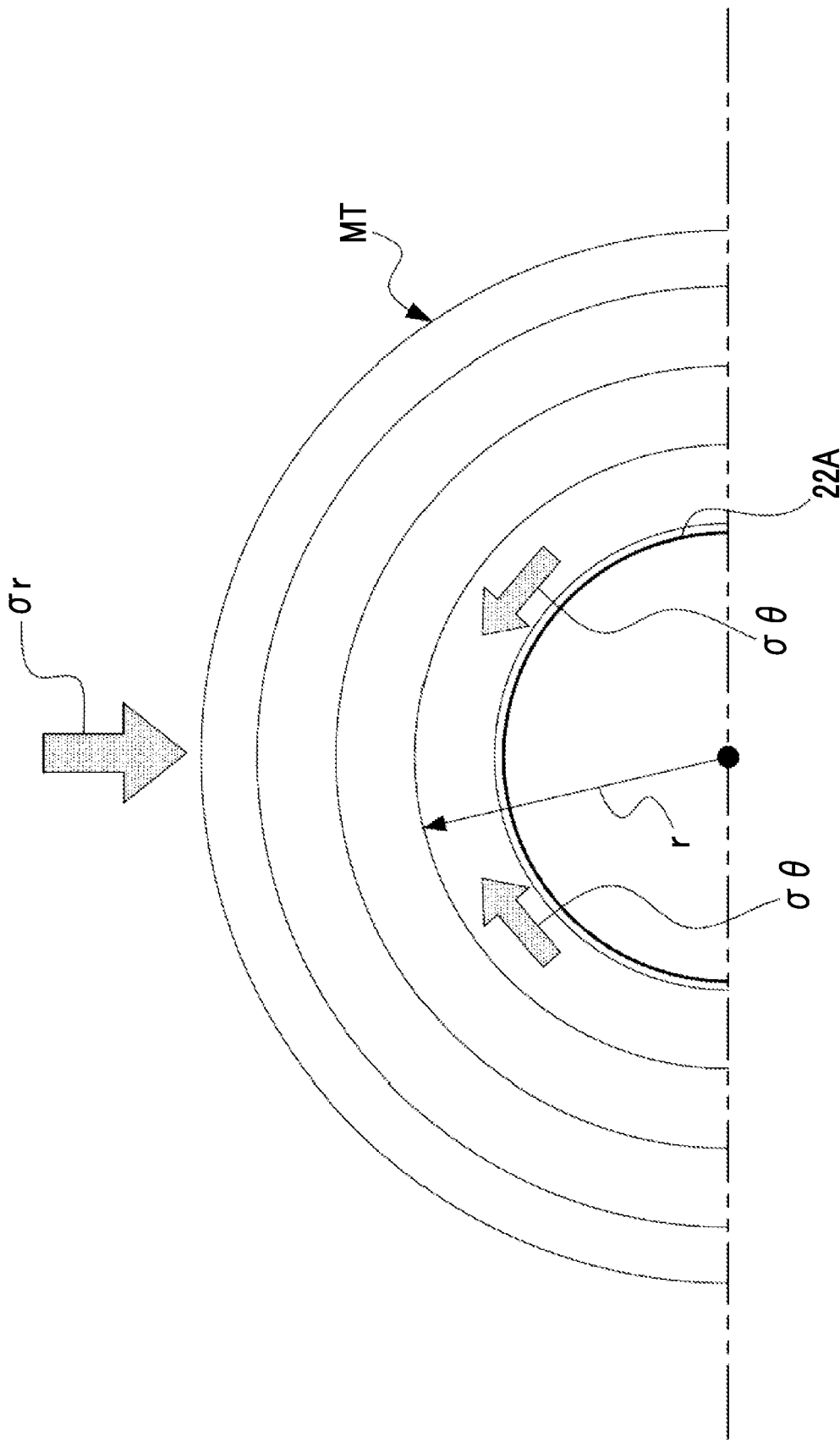
FIG. 9 is a conceptual diagram showing an example of a state of a stress generated in the magnetic tape in a state of being wound around a reel hub of the cartridge reel according to the embodiment.

As shown in FIG. 9 as an example, in the reel hub 22A, in a case in which the contraction deformation is generated due to the fastening with the magnetic tape MT, the reel hub 22A side of the wound magnetic tape MT contracts along the circumferential direction of the magnetic tape MT. That is, a circumferential direction stress $\sigma\theta$ in a direction of the contraction is generated on the reel hub 22A side of the magnetic tape MT. Also, in the magnetic tape MT, a radial direction stress $\sigma r$ is generated by the tension in a case in which the magnetic tape MT is wound around the reel hub 22A.

As shown in FIG. 10 as an example, in a case in which the radial direction stress $\sigma r$ is generated with respect to the magnetic tape MT, the width of the magnetic tape MT expands in accordance with the Poisson's ratio of the magnetic tape MT (see arrows D1 and D2 in FIG. 10). In addition, in a case in which the circumferential direction stress $\sigma\theta$ in the direction of the contraction is generated with respect to the magnetic tape MT, the width of the magnetic tape MT expands in accordance with the Poisson's ratio of the magnetic tape MT (see arrows D3 and D4 in FIG. 10). In this way, on the reel hub 22A side of the magnetic tape MT, in addition to the expansion in the width of the magnetic tape MT due to the radial direction stress $\sigma r$, the expansion in the width of the magnetic tape MT due to the circumferential direction stress $\sigma\theta$ is generated. Therefore, in the magnetic tape MT wound around the reel hub 22A, a region on the reel hub 22A side of the magnetic tape MT has a larger width than a region other than the region on the reel hub 22A side of the magnetic tape MT (for example, a region on an outer peripheral side of the cartridge reel 22).

For example, in a state in which the magnetic tape MT is wound around the cartridge reel 22, the deformation due to the stress generated in the magnetic tape MT (for example, creep deformation in a case of long-term storage) is generated. That is, in the magnetic tape MT, the width of the region on the reel hub 22A side is wider than that before the storage, and the width of the region on the outer peripheral side of the cartridge reel 22 is narrower than before the storage. The non-uniform deformation of the width in the magnetic tape MT makes it difficult to accurately position the position of the magnetic head with respect to the magnetic tape MT. As a result, a recording defect or a reading defect of data in the magnetic tape MT is caused. This problem is further pronounced as a data track width is narrower as the recording density of the magnetic tape MT is increased.

Therefore, in the present embodiment, as shown in FIG. 11 as an example, the circumferential direction stress $\sigma\theta$ in a tensile direction is generated with respect to the magnetic tape MT. In a case in which the circumferential direction stress $\sigma\theta$ in the tensile direction is generated with respect to the magnetic tape MT, the width of the magnetic tape MT contracts in accordance with the Poisson's ratio of the magnetic tape MT (see arrows E1 and E2 in FIG. 11). As a result, the expansion in the width of the magnetic tape MT due to the radial direction stress σr with respect to the magnetic tape MT (see arrows D1 and D2 in FIG. 11) can be suppressed by the contraction of the magnetic tape MT in the width direction due to the circumferential direction stress σθ in the tensile direction. As a result, in the magnetic tape MT wound around the reel hub 22A, it is possible to suppress a case in which the width of the region on the reel hub 22A side of the magnetic tape MT becomes larger than the width of the region other than the region on the reel hub 22A side of the magnetic tape MT (for example, the region on the outer peripheral side of the cartridge reel 22).

Figure 12:
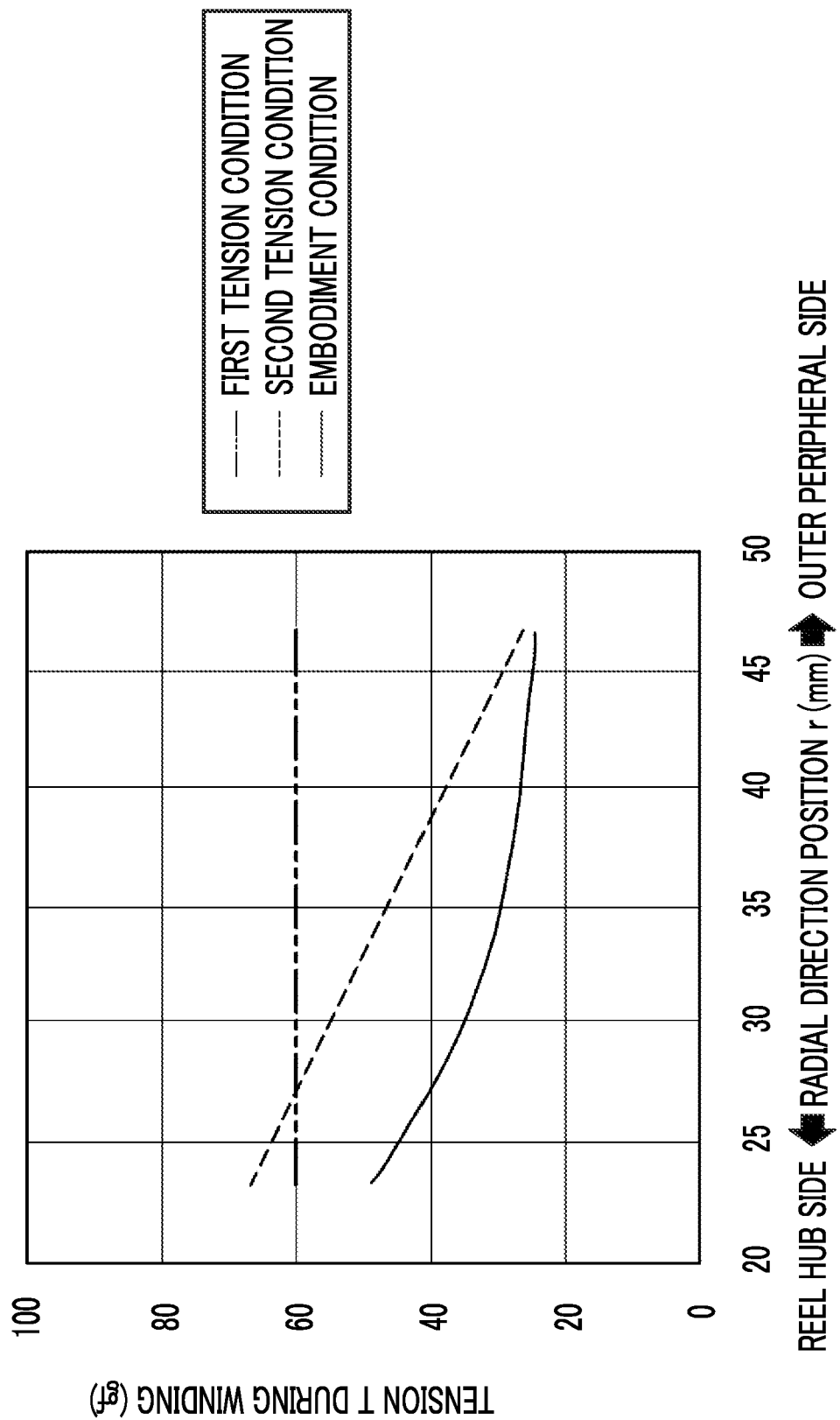
FIG. 12 is a graph showing an example of a relationship between a radial direction position of the magnetic tape and a tension during winding.

As shown in FIG. 12 as an example, under a tension condition during the winding of the magnetic tape MT known in the related art (hereinafter, also simply referred to as a "first tension condition known in the related art"), a tension T during the winding is regular at any position of a radial direction position r in a state in which the magnetic tape MT is wound around the cartridge reel 22 (hereinafter, also simply referred to as a "radial direction position r"). Here, the radial direction position r corresponds to a longitudinal direction position of the magnetic tape MT. In addition, under other tension conditions known in the related art (hereinafter, also simply referred to as a "second tension condition known in the related art"), the tension T during the winding is monotonically decreased at the radial direction position r from the reel hub 22A side to the outer peripheral side.

In the tension condition according to the present embodiment, the tension T during the winding with respect to the radial direction position r of the magnetic tape MT is changed in accordance with the radial direction position r of the magnetic tape MT. For example, in the longitudinal direction LD of the magnetic tape MT, a rate of change of the tension T with respect to the radial direction position r is larger in the region on the reel hub 22A side than in the region on the outer peripheral side. It should be noted that, although the description has been made here with reference to the form example in which the region on the reel hub 22A side has a larger rate of change than the region on the outer peripheral side, the technology of the present disclosure is not limited to this. The technology of the present disclosure is established even in a case in which the rate of change of the tension T in the region on the reel hub 22A side is equal to or larger than the rate of change of the tension T in the region on the outer peripheral side. Further, the rate of change of the tension T with respect to the radial direction position r is non-linearly decreased from the reel hub 22A side to the outer peripheral side. Stated another way, in the example shown in FIG. 12, the rate of change of the tension T with respect to the radial direction position r is decreased in a curved shape having a change of a downwardly protrusion inclination as compared with the second tension condition known in the related art. Here, the tension condition according to the present embodiment is obtained, for example, based on calculations and experiments based on a balance expression of moments in the magnetic tape MT in a state of being wound around the reel hub 22A. That is, from the calculations and experiments based on the balance expression of moments, a result is obtained in which a radial direction limit stress σr1 (that is, the radial direction stress σr in a case in which the magnetic tape MT is loosely wound in a state in which the magnetic tape MT is wound around the reel hub 22A) is inversely proportional to the square of the radial direction position r. Then, a relationship between the tension T derived from the radial direction limit stress σr1 and the radial direction position r in the magnetic tape MT is obtained. Specifically, the tension condition according to the present embodiment can be obtained by Expression (1).

$$T = C/r^2 \qquad (1)$$

Here, T is tension, C is constant, r is the radial direction position of the magnetic tape wound around the reel.

By winding the magnetic tape MT under the tension condition according to the present embodiment, the circumferential direction stress σθ in the tensile direction is generated in the region on the reel hub 22A side of the magnetic tape MT. As a result, the width of the magnetic tape MT contracts in the region of the magnetic tape MT on the reel hub 22A side. As a result, the expansion in the width of the magnetic tape MT due to the radial direction stress σr with respect to the magnetic tape MT can be suppressed by the contraction of the magnetic tape MT in the width direction due to the circumferential direction stress σθ in the tensile direction. As a result, in the magnetic tape MT wound around the reel hub 22A, it is possible to suppress a case in which the width on the reel hub 22A side of the magnetic tape MT becomes larger than the width of the region other than the region on the reel hub 22A side of the magnetic tape MT (for example, the region on the outer peripheral side of the cartridge reel 22).

Figure 13:
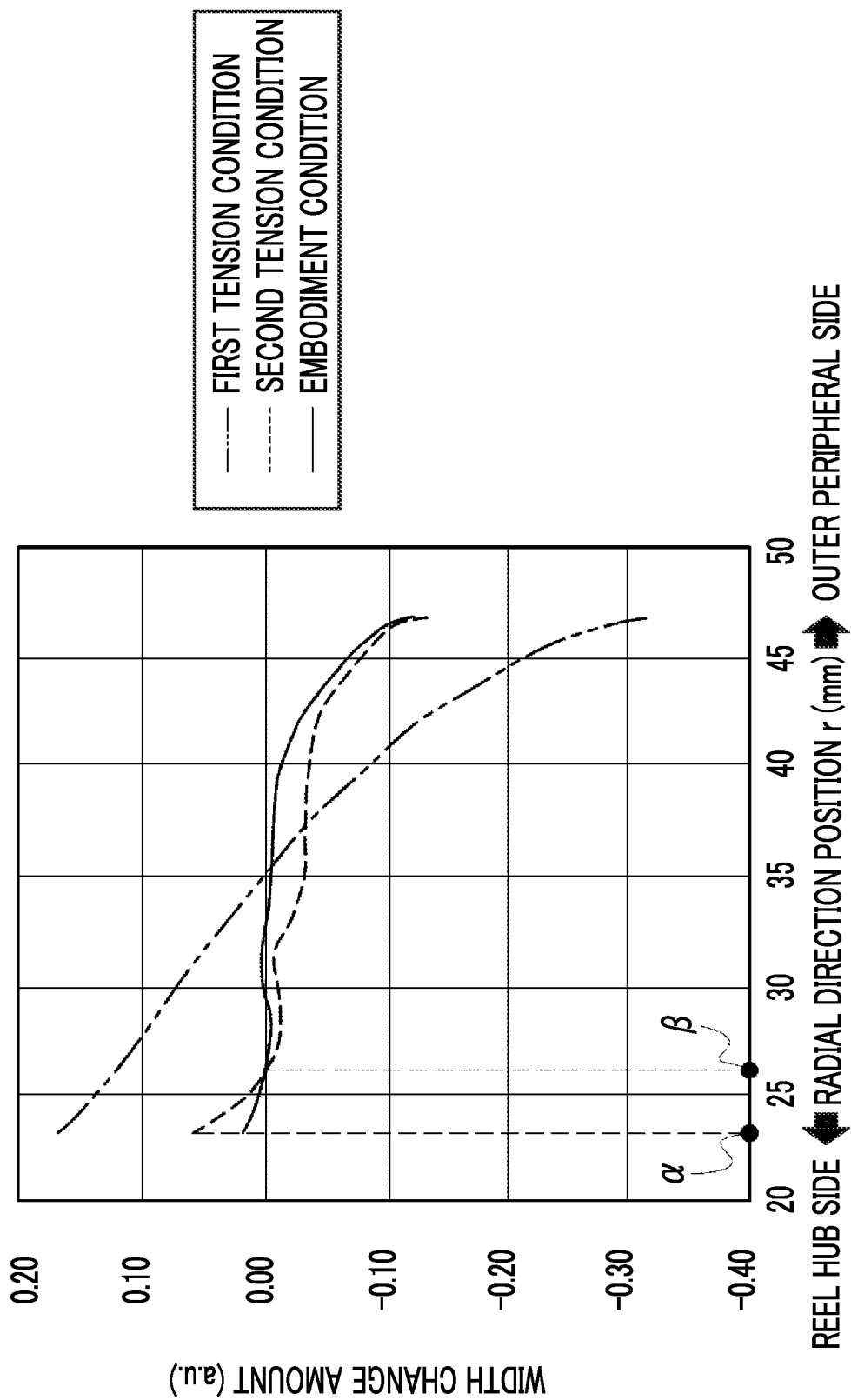
FIG. 13 is a graph showing an example of a relationship between the radial direction position of the magnetic tape and a width change amount.

As shown in FIG. 13 as an example, under the first tension condition known in the related art, the width change amount of the magnetic tape MT before and after the magnetic tape MT is wound around the reel hub 22A (hereinafter, also simply referred to as a width change amount) is greatly changed in accordance with the radial direction position r as compared with the second tension condition known in the related art and the tension condition according to the present embodiment. Here, the width change amount is obtained, for example, based on the interval between the servo bands SB adjacent to each other in the width direction WD of the magnetic tape MT (that is, a servo band interval). That is, in the adjacent servo bands SB, the PES is obtained based on the result of reading the servo patterns 58 included in each servo band SB. The PES is a signal indicating an amount of deviation of the servo reading element SR from the original position on the servo band SB along the width direction WD. Moreover, the position of the servo reading element SR with respect to the servo band SB is detected based on the PES. As a result, since the position of the servo reading element SR in the adjacent servo bands SB is obtained, the servo band interval is calculated. Next, the width change amount is obtained based on the servo band interval. It is desirable that the width change amount is obtained based on an average value of the servo band intervals (that is, an average value of the servo band intervals in the longitudinal direction LD of the magnetic tape MT). The width change amount is also obtained, for example, by measuring the width of the magnetic tape MT using a laser displacement meter (for example, KEYENCE LS-9030 manufactured by KEYENCE CORPORATION) and the like. In addition, under the second tension condition known in the related art, the width change amount is smaller than that of the first tension condition known in the related art, but the width expands on the reel hub 22A side. That is, in the example shown in FIG. 13, the width change amount under the second tension condition known in the related art is large from α to β at the radial direction position r. In the tension condition according to the present embodiment, the width change amount is a value close to 0 from the reel hub 22A side to the outer peripheral side, and the width change of the magnetic tape MT is suppressed before and after the magnetic tape MT is wound around the reel hub 22A. Specifically, in the example shown in FIG. 13, the width change amount is small from α to β of the radial direction position r, and the change of the width change amount with respect to the radial direction position r is also gradual.

Figure 14:
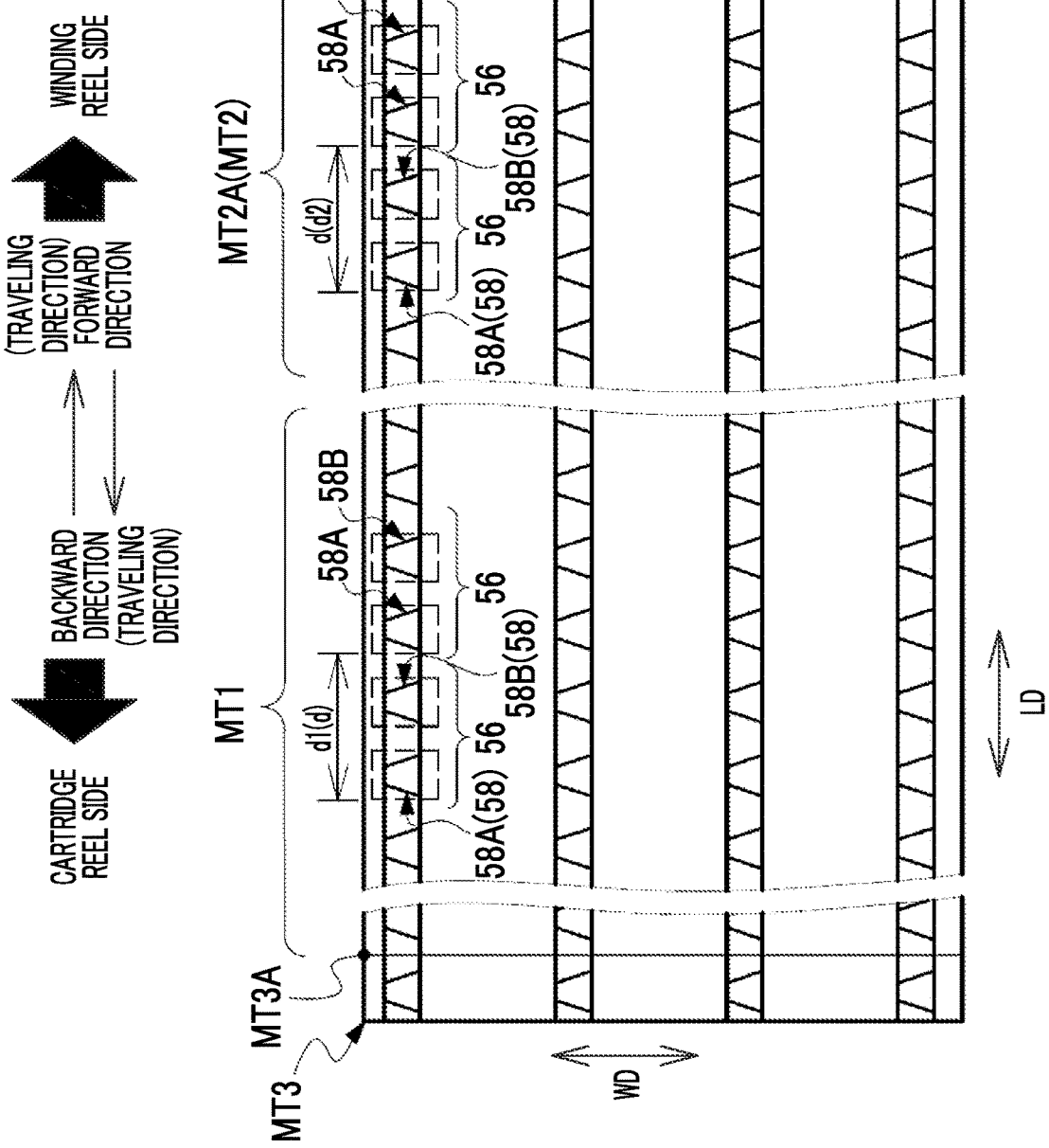
FIG. 14 is a conceptual diagram showing an example of an aspect in which the magnetic tape according to the embodiment is observed from the front surface side of the magnetic tape.

As shown in FIG. 14 as an example, in the magnetic tape MT wound under the tension condition according to the present embodiment, the elongation corresponding to the tension applied to the magnetic tape MT is generated in accordance with the longitudinal direction position of the magnetic tape MT. In the magnetic tape MT, in the region influenced by the width change accompanied by the deformation of the cartridge reel 22, the degree of elongation is made larger than in the other regions (that is, the circumferential direction stress σθ in the tensile direction is applied), so that the expansion in the width can be suppressed.

The magnetic tape MT has a core side region MT1 and an outer peripheral side region MT2. The core side region MT1 refers to the region MT1 on the reel hub 22A side of the magnetic tape MT (that is, a region on the core side of the cartridge reel 22). The outer peripheral side region MT2 refers to the region MT2 on the outer peripheral side of the magnetic tape MT (that is, a region on the outer peripheral side of the cartridge reel 22) with respect to the core side region MT1. The core side region MT1 is a predetermined region that is influenced by the width change of the magnetic tape MT accompanied by the deformation of the reel hub 22A due to the winding of the magnetic tape MT. The degree of elongation in the core side region MT1 is equal to or larger than the degree of elongation in the outer peripheral side region MT2. Stated another way, the tension applied to the core side region MT1 is not at least smaller than the tension applied to the outer peripheral side region MT2. Here, the degree of elongation refers to an amount of elongation of the magnetic tape MT around a unit length in the longitudinal direction LD. The core side region MT1 is an example of a "first region" according to the technology of the present disclosure. Also, the outer peripheral side region MT2 is an example of a "second region" according to the technology of the present disclosure.

The outer peripheral side region MT2 is a region that includes an intermediate region MT2A in the longitudinal direction LD of the magnetic tape MT. Here, the intermediate region MT2A refers to a region having the width change amount of the magnetic tape MT that is smaller than the width change amount of the magnetic tape MT in the core side region MT1 and that is smaller than the width change amount of the magnetic tape MT in the outer peripheral side region MT2. The intermediate region MT2A is, for example, a part of the magnetic tape MT between a termination position MT3A of an EOT region MT3 and a start end position MT4A of a BOT region MT4, and is a region excluding the core side region MT1. Further, the intermediate region MT2A may be determined in accordance with the length of the core side region MT1 or may be determined in accordance with the material of the magnetic tape MT. The intermediate region MT2A is an example of an "intermediate region" according to the technology of the present disclosure.

For example, a case will be considered in which the length (that is, a longitudinal distance) of the magnetic tape MT is 1000 m. In this case, the core side region MT1 is, for example, a section having a length of 100 m from the termination position MT3A (that is, a tape recording/reproduction termination position) of the EOT region MT3. In addition, the outer peripheral side region MT2 is, for example, a section having a length of 100 m starting from a position 500 m from the EOT region MT3.

Here, the servo patterns 58 are formed in the servo band SB of the magnetic tape MT along the longitudinal direction LD. The degree of elongation of the magnetic tape MT is obtained based on the servo patterns 58 of the magnetic tape MT. That is, in a case in which the tension is applied to the magnetic tape MT under the tension condition according to the present embodiment, the degree of elongation of the core side region MT1 is larger than the degree of elongation of the outer peripheral side region MT2. Accordingly, an interval d between the servo patterns 58 adjacent to the longitudinal direction LD also expands, an interval d1 between the servo patterns 58 in the core side region MT1 is larger than an interval d2 between the servo patterns 58 in the outer peripheral side region MT2. Here, the interval d of the servo patterns 58 refers to an interval between the servo pattern 58A in a certain frame 56 and the servo pattern 58A in the adjacent frame 56. It should be noted that this is merely an example, and the interval d of the servo patterns 58 may be an interval between the servo pattern 58B in a certain frame 56 and the servo pattern 58B in the adjacent frame 56. In this way, the degree of elongation of the magnetic tape MT is obtained based on the interval d between the servo patterns 58. The interval d1 is an example of a "first interval" according to the technology of the present disclosure, and the interval d2 is an example of a "second interval" according to the technology of the present disclosure.

Figure 15:
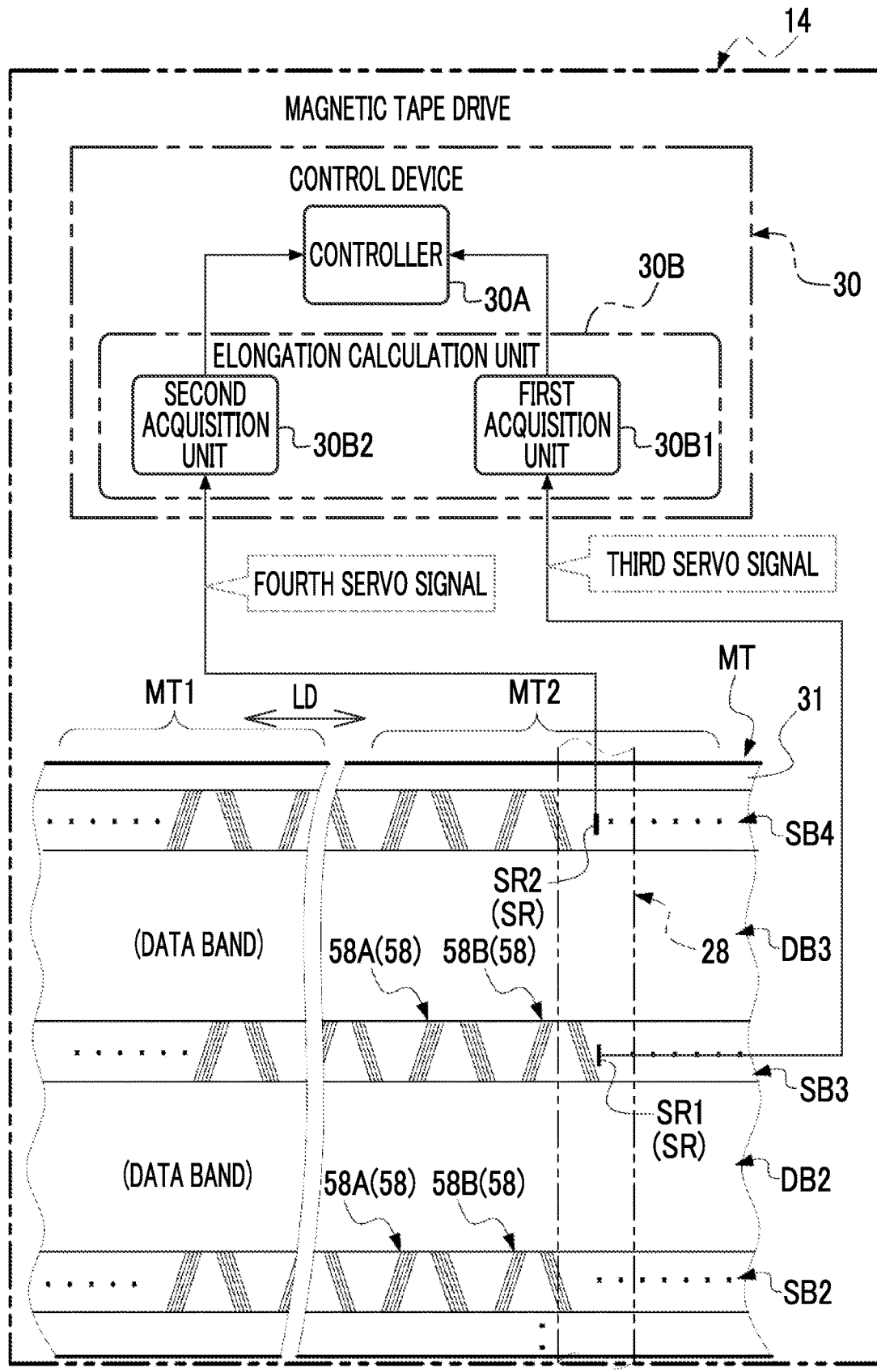
FIG. 15 is a conceptual diagram showing an example of processing contents of an elongation calculation unit and a controller provided in a control device provided in the magnetic tape drive according to the embodiment.

As an example, as shown in FIG. 15, the control device 30 includes a controller 30A and an elongation calculation unit 30B. The elongation calculation unit 30B includes a first acquisition unit 30B1 and a second acquisition unit 30B2. The elongation calculation unit 30B acquires the servo signal that is a result of reading the servo pattern 58 in the servo band SB by the servo reading element SR, and calculates the degree of elongation in the magnetic tape MT based on the acquired servo signal.

The first acquisition unit 30B1 acquires a result of reading the servo pattern 58 by the servo reading element SR1, and the second acquisition unit 30B2 acquires a result of reading the servo pattern 58 by the servo reading element SR2.

In the example shown in FIG. 15, the first acquisition unit 30B1 acquires a third servo signal SBS3 obtained by reading the servo pattern 58 in the servo band SB3 by the servo reading element SR1. Also, the second acquisition unit 30B2 acquires a fourth servo signal SBS4 obtained by reading the servo pattern 58 in the servo band SB3 by the servo reading element SR2.

Figure 16:
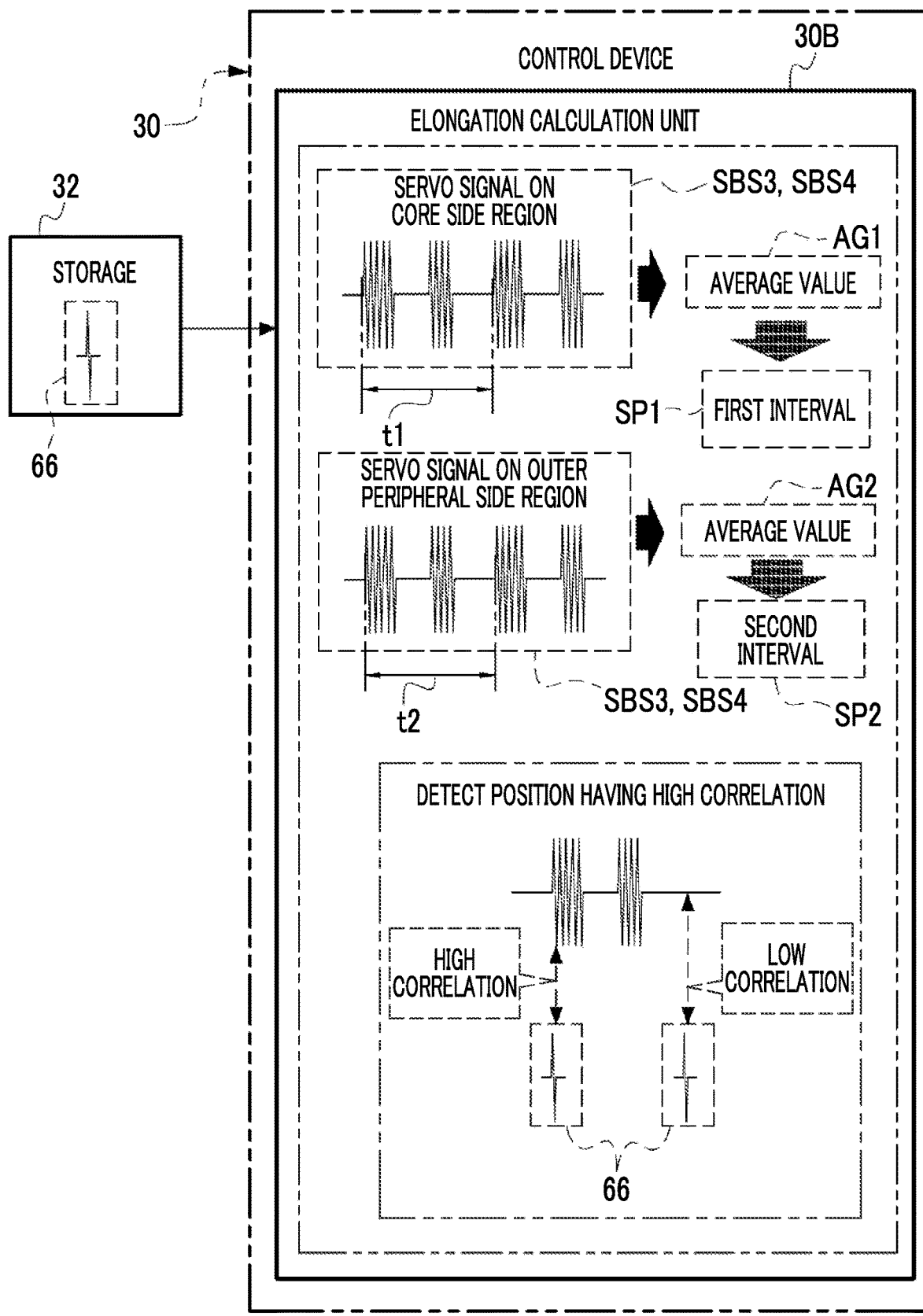
FIG. 16 is a conceptual diagram showing an example of a processing content of the elongation calculation unit provided in the control device provided in the magnetic tape drive according to the embodiment.

As shown in FIG. 16 as an example, the elongation calculation unit 30B calculates a first interval SP1 based on the servo signals of the core side region MT1 acquired by the first acquisition unit 30B1 and the second acquisition unit 30B2. Further, the elongation calculation unit 30B calculates the second interval SP2 based on the servo signals of the outer peripheral side region MT2 acquired by the first acquisition unit 30B1 and the second acquisition unit 30B2.

Specifically, the elongation calculation unit 30B detects a pulse waveform from the third servo signal SBS3 and the fourth servo signal SBS4 by using an autocorrelation coefficient. An ideal waveform signal 66 is stored in the storage 32. The ideal waveform signal 66 is a signal indicating a single ideal waveform included in the servo signal (for example, an ideal signal which is a result of reading one of ideal magnetization straight lines included in the servo pattern 58 by the servo reading element SR). The ideal waveform signal 66 can be said to be a sample signal to be compared with the servo signal. It should be noted that, here, the form example has been described in which the ideal waveform signal 66 is stored in the storage 32, but this is merely an example, and the ideal waveform signal 66 may be stored in, for example, the cartridge memory 24 instead of the storage 32 or together with the storage 32. In addition, the ideal waveform signal 66 may be recorded in the EOT region MT3 (see FIG. 14) provided at the beginning of the magnetic tape MT and/or in the BOT region MT4 (see FIG. 14) provided at the end of the magnetic tape MT.

The autocorrelation coefficient used by the elongation calculation unit 30B is a coefficient indicating a degree of correlation between the servo signal and the ideal waveform signal 66. The elongation calculation unit 30B acquires the ideal waveform signal 66 from the storage 32 to compare the acquired ideal waveform signal 66 with the servo signal. Moreover, the elongation calculation unit 30B calculates the autocorrelation coefficient based on the comparison result. The elongation calculation unit 30B detects a position on the servo band SB at which the correlation between the servo signal and the ideal waveform signal 66 is high (for example, a position at which the servo signal and the ideal waveform signal 66 match) in accordance with the autocorrelation coefficient.

The calculation of the elongation by the elongation calculation unit 30B is performed, for example, as follows. As described above, in a case in which the tension is applied to the magnetic tape MT under the tension condition according to the present embodiment, the degree of elongation of the core side region MT1 is larger than the degree of elongation of the outer peripheral side region MT2. Reflecting this fact, the interval between the servo patterns 58 adjacent to each other in the longitudinal direction LD is also different between the core side region MT1 and the outer peripheral side region MT2. Therefore, the elongation calculation unit 30B calculates the interval d between the servo patterns 58 based on the pulse waveform detected in accordance with the autocorrelation coefficient. That is, the elongation calculation unit 30B acquires a detected time difference t (that is, a pulse interval t) between a pulse signal corresponding to the servo pattern 58A included in a certain frame 56 and a pulse signal corresponding to the servo pattern 58A included in the adjacent frame 56.

Further, the elongation calculation unit 30B calculates an average value AG1 of pulse intervals t1 in the core side region MT1. In addition, the elongation calculation unit 30B calculates an average value AG2 of pulse intervals t2 in the outer peripheral side region MT2.

Figure 17:
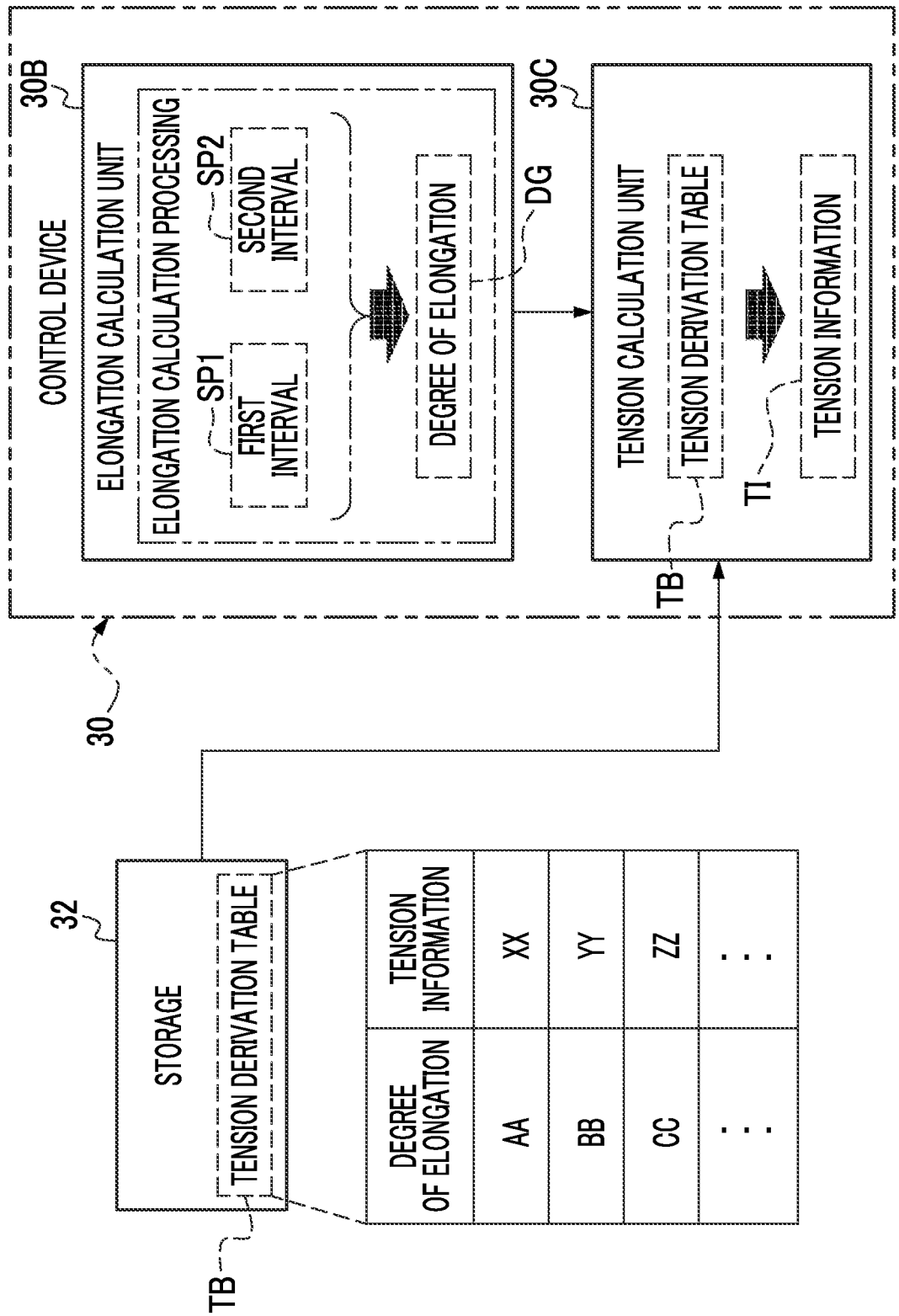
FIG. 17 is a conceptual diagram showing an example of processing contents of the elongation calculation unit and a tension calculation unit provided in the control device provided in the magnetic tape drive according to the embodiment.

As shown in FIG. 17 as an example, the elongation calculation unit 30B calculates the first interval SP1 which is the interval between the servo patterns 58 in the core side region MT1 by multiplying the average value AG1 of the pulse intervals t1 in the core side region MT1 by the transport speed of the magnetic tape MT. Then, the elongation calculation unit 30B calculates the second interval SP2 which is the interval between the servo patterns 58 in the outer peripheral side region MT2 by multiplying the average value AG2 of the pulse intervals t2 in the outer peripheral side region MT2 by the transport speed of the magnetic tape MT.

It should be noted that, here, although the form example has been described in which the first interval SP1 is calculated by using the average value of the pulse intervals t1 in the core side region MT1, the technology of the present disclosure is not limited to this. It is sufficient that the first interval SP1 is calculated by using the statistic value of the pulse intervals t1 in the core side region MT1, and the technology of the present disclosure is established even in a case in which a mode value or a median value is used. Also, similarly, for the outer peripheral side region MT2, it is sufficient that the second interval SP2 is calculated by using the statistic value of the pulse intervals t2, and the technology of the present disclosure is established even in a case in which a mode value or a median value is used.

The elongation calculation unit 30B calculates a degree of elongation DG based on the first interval SP1 and the second interval SP2. The degree of elongation DG in the core side region MT1 is obtained, for example, by dividing the first interval SP1 by the width of the magnetic tape MT in an initial state. Here, the initial state refers to a state before the magnetic processing is performed on the data band DB. Examples of the initial state include a state during shipment from the factory. In addition, the degree of elongation DG of the outer peripheral side region MT2 is obtained by dividing the second interval SP2 by the width of the magnetic tape MT in the initial state. The elongation calculation unit 30B outputs the degree of elongation DG to the tension calculation unit 30C.

The tension calculation unit 30C generates tension information TI by using a tension derivation table TB. The tension information TI is information for changing the rate of change of the tension T with respect to the longitudinal direction position of the magnetic tape MT in accordance with the longitudinal direction position of the magnetic tape MT. The tension derivation table TB is a table in which the degree of elongation DG is defined as an input value and the tension information TI is defined as an output value. The tension derivation table TB is stored in the storage 32 in advance. The tension calculation unit 30C acquires the tension derivation table TB from the storage 32. The tension calculation unit 30C derives the tension information TI corresponding to the degree of elongation DG from the tension derivation table TB.

It should be noted that, here, although the form example has been described in which the tension information TI is generated by using the tension derivation table TB, the technology of the present disclosure is not limited to this. For example, the tension information may be generated by using a tension derivation calculation expression in the tension calculation unit 30C. The tension derivation calculation expression is a calculation expression in which the degree of elongation DG is defined as an independent variable and a numerical value indicating the tension information TI is defined as a dependent variable.

Figure 18:
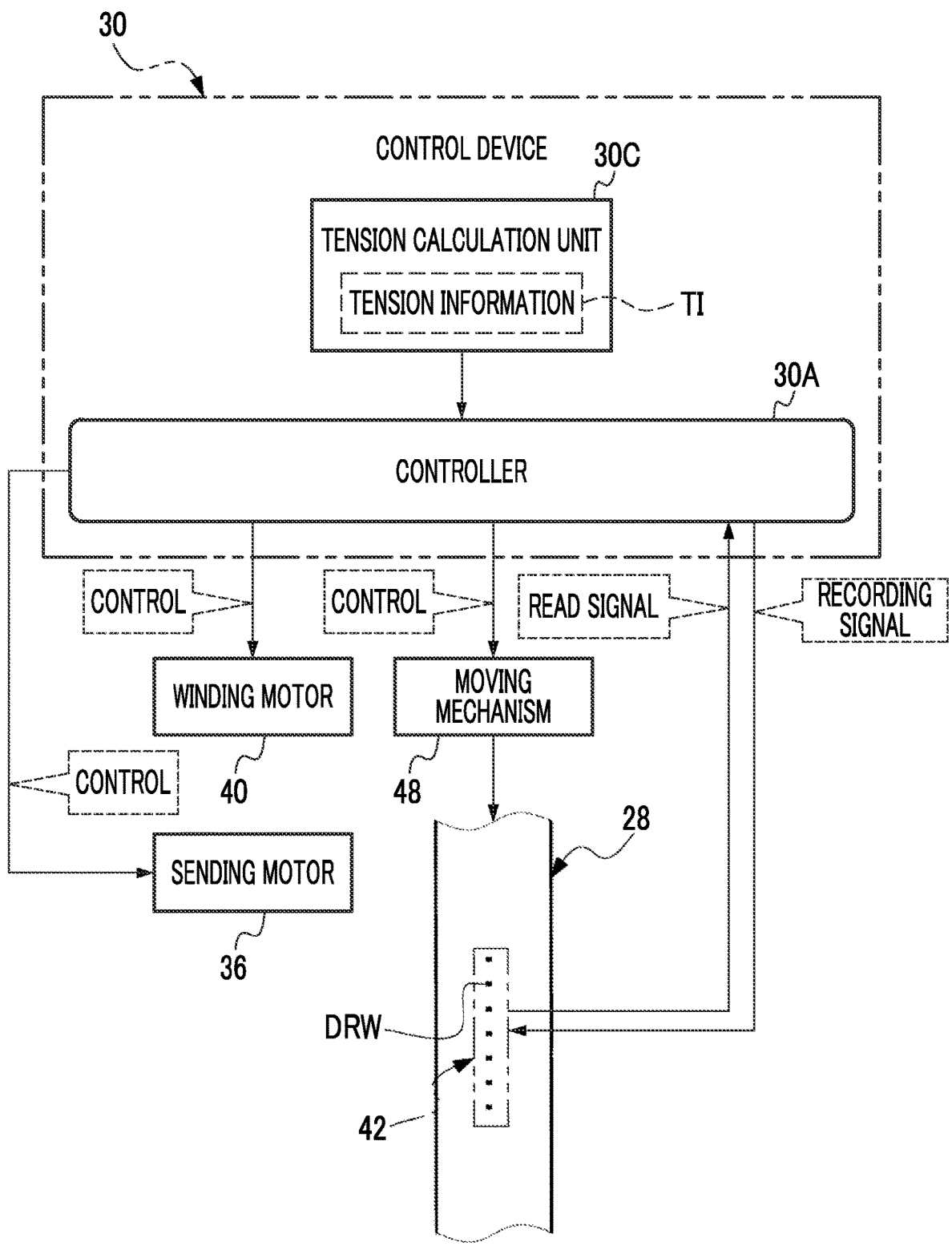
FIG. 18 is a conceptual diagram showing an example of processing contents of the tension calculation unit and the controller provided in the control device provided in the magnetic tape drive according to the embodiment.

As shown in FIG. 18 as an example, the tension calculation unit 30C outputs the tension information TI to the controller 30A. The controller 30A controls the tension T applied to the magnetic tape MT based on the tension information TI. The tension information TI is obtained in accordance with the degree of elongation DG That is, the controller 30A controls the tension T applied to the magnetic tape MT in accordance with the degree of elongation DG. Further, the degree of elongation DG is determined in accordance with the longitudinal direction position of the magnetic tape MT. Therefore, the controller 30A changes the rate of change of the tension T with respect to the longitudinal direction position of the magnetic tape MT in accordance with the longitudinal direction position of the magnetic tape MT. Specifically, the controller 30A applies the tension T to the magnetic tape MT by adjusting the rotation speed, the rotation torque, and the like of each of the sending motor 36 and the winding motor 40. In addition, the controller 30A controls the tension applied to the magnetic tape MT by adjusting the rotation speed, the rotation torque, and the like of each of the sending motor 36 and the winding motor 40.

Figure 19:
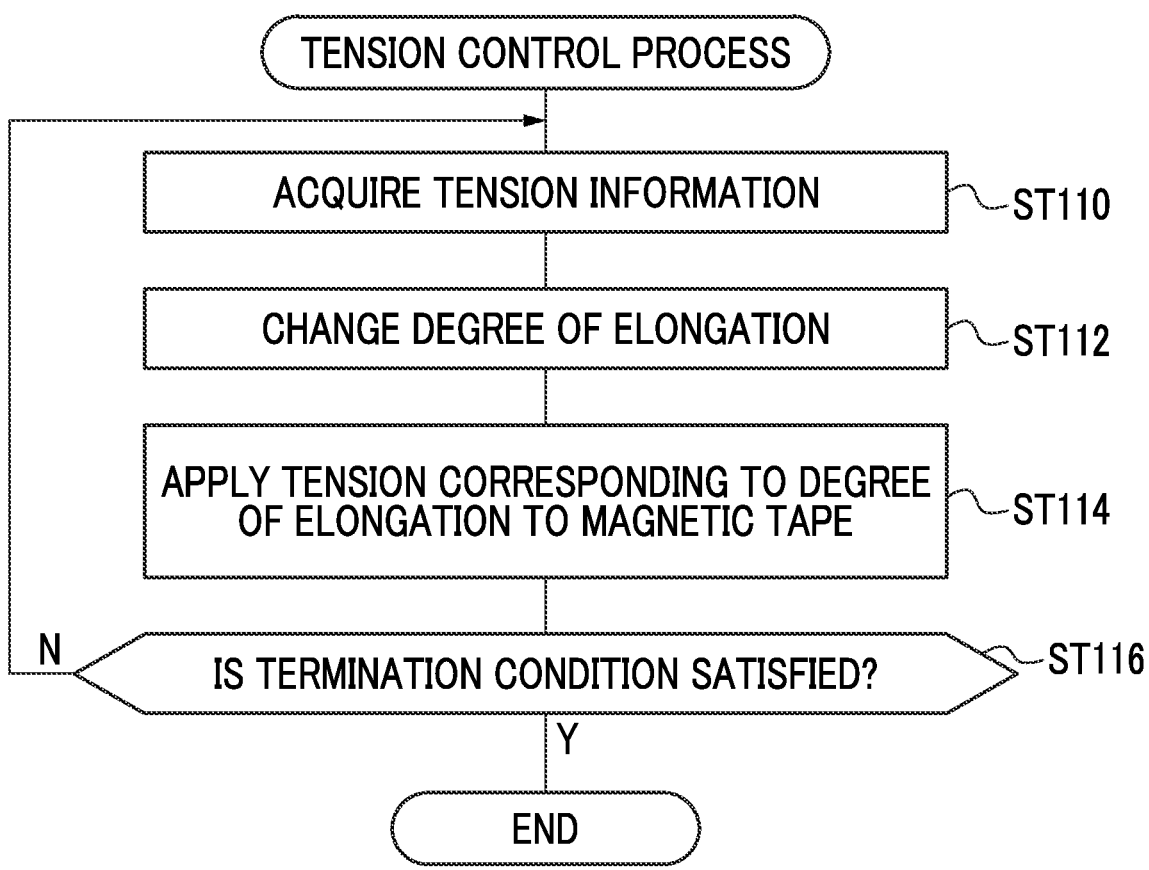
FIG. 19 is a flowchart showing an example of a tension control process according to the embodiment.

Next, the action of the control device 30 will be described with reference to FIG. 19. FIG. 19 shows an example of a flow of the tension control process performed by the controller 30A. The flow of the tension control process shown in FIG. 19 is an example of a "tension control method" according to the technology of the present disclosure.

In the tension control process shown in FIG. 19, first, in step ST110, the controller 30A acquires the tension information TI. After the processing of step ST110 is executed, the tension control process proceeds to step ST112.

In step ST112, the controller 30A changes the degree of elongation DG based on the tension information TI acquired in step ST110. For example, the controller 30A changes the degree of elongation DG by changing the rate of change of the tension T with respect to the longitudinal direction position of the magnetic tape MT in accordance with the longitudinal direction position of the magnetic tape MT. After the processing of step ST112 is executed, the tension control process proceeds to step ST114.

In step ST114, the controller 30A adjusts the rotation speed, the rotation torque, and the like of each of the sending motor 36 and the winding motor 40. Accordingly, the controller 30A applies the tension corresponding to the degree of elongation DG to the magnetic tape MT via the sending motor 36 and the winding motor 40. After the processing of step ST114 is executed, the tension control process proceeds to step ST116.

In step ST116, the controller 30A determines whether or not a condition for terminating the tension control process (hereinafter, referred to as "termination condition") is satisfied. Examples of the termination condition include a condition that the winding of the magnetic tape MT is completed. In step ST116, in a case in which the termination condition is not satisfied, a negative determination is made, and the tension control process proceeds to step ST110. In step ST116, in a case in which the termination condition is satisfied, a positive determination is made, and the tension control process is terminated.

As described above, the magnetic tape cartridge 12 according to the present embodiment comprises the magnetic tape MT wound around the cartridge reel 22, and the magnetic tape MT includes the core side region MT1 and the outer peripheral side region MT2, and regarding the degree of elongation DG in the longitudinal direction LD of the magnetic tape MT, the degree of elongation DG of the core side region MT1 is equal to or larger than the degree of elongation DG of the outer peripheral side region MT2. By winding the magnetic tape MT around the cartridge reel 22, the load accompanied by the fastening is applied to the cartridge reel 22 from the magnetic tape MT. As a result, since the cartridge reel 22 contracts and is deformed, the stress (that is, the circumferential direction stress $\sigma\theta$) in the direction of contracting (that is, the direction of the contraction) in the longitudinal direction LD is also generated in the magnetic tape MT. Then, the width of the magnetic tape is changed (that is, the width expands). In the magnetic tape MT according to the present embodiment, the degree of elongation DG in the longitudinal direction LD of the magnetic tape MT is larger in the core side region MT1 which is the region influenced by the expansion of the width than in the outer peripheral side region MT2 which is the region on the outer peripheral side of the cartridge reel 22. The fact that the degree of elongation DG in the longitudinal direction LD in the core side region MT1 is larger than that in the outer peripheral side region MT2 means that the stress (that is, the circumferential direction stress $\sigma\theta$) in a direction of pulling (that is, a tensile direction) in the longitudinal direction LD of the magnetic tape MT is generated on the core side (that is, the reel hub 22A side) of the cartridge reel 22. The stress in the tensile direction contributes to the contraction of the width of the magnetic tape MT. Therefore, with the present configuration, the deformation of the width of the magnetic tape MT is suppressed.

In addition, in the magnetic tape cartridge 12 according to the present embodiment, the outer peripheral side region MT2 includes the intermediate region MT2A in the longitudinal direction LD of the magnetic tape MT. Since the influence of the deformation of the cartridge reel 22 is small in the intermediate region MT2A, the width change of the magnetic tape MT is smaller in the intermediate region MT2A than in the core side region MT1. Therefore, in the core side region MT1, the elongation is generated with respect to the intermediate region MT2A, so that the generation of the elongation is relatively remarkable. As a result, it is easy to detect the elongation. The fact that the degree of elongation DG in the longitudinal direction LD in the core side region MT1 means that the stress (that is, the circumferential direction stress $\sigma\theta$) in the tensile direction is generated on the core side (that is, the reel hub 22A side) of the cartridge reel 22. The stress in the tensile direction contributes to the contraction of the width of the magnetic tape MT. Therefore, with the present configuration, the deformation of the width of the magnetic tape MT is suppressed.

In addition, in the magnetic tape cartridge 12 according to the present embodiment, the plurality of servo patterns 58 are formed on the magnetic tape MT in the longitudinal direction LD. In addition, the degree of elongation DG is obtained based on the first interval SP1 which is the interval between the servo patterns 58 adjacent to each other in the longitudinal direction LD of the magnetic tape MT in the core side region MT1 and the second interval SP2 which is the interval between the servo patterns 58 adjacent to each other in the longitudinal direction LD of the magnetic tape MT in the outer peripheral side region MT2. Therefore, with the present configuration, since the degree of elongation DG is obtained from the interval between the servo patterns 58 of the magnetic tape MT, the degree of elongation DG is accurately calculated. For example, the degree of elongation DG of the magnetic tape MT after the storage can be accurately obtained as compared with a case in which the degree of elongation DG is always obtained as regular.

In addition, in the magnetic tape cartridge 12 according to the present embodiment, a value of the first interval SP1 is a statistic value (for example, an average value) of the intervals between the servo patterns 58 adjacent to each other in the longitudinal direction LD of the magnetic tape MT in the core side region MT1. The first interval SP1 is obtained from the statistic value of the intervals between the servo patterns 58. Also, the degree of elongation DG in the core side region MT1 is obtained based on the first interval SP1. Therefore, with the present configuration, the degree of elongation DG can be accurately calculated. For example, the degree of elongation DG is accurately obtained as compared with a case in which the value of the first interval SP1 is always obtained based on the interval between the servo patterns 58 at a predetermined position.

Also, in the magnetic tape cartridge 12 according to the present embodiment, a value of the second interval SP2 is a statistic value of the intervals between the servo patterns 58 adjacent to each other in the longitudinal direction LD of the magnetic tape MT in the outer peripheral side region MT2. The second interval SP2 is obtained from the statistic value of the intervals between the servo patterns 58. Also, the degree of elongation DG in the outer peripheral side region MT2 is obtained based on the second interval SP2. Therefore, with the present configuration, the degree of elongation DG can be accurately calculated. For example, the degree of elongation DG is accurately obtained as compared with a case in which the value of the second interval SP2 is always obtained based on the interval between the servo patterns 58 at a predetermined position.

Further, in the magnetic tape drive 14 according to the present embodiment, the tension is applied in accordance with the degree of elongation DG of the magnetic tape MT. By winding the magnetic tape MT around the cartridge reel 22, the load accompanied by the fastening is generated in the cartridge reel 22 from the magnetic tape MT. As a result, since the cartridge reel 22 contracts and is deformed, the stress in the direction of the contraction is also generated in the magnetic tape MT in the longitudinal direction LD. Then, the width of the magnetic tape is changed (that is, the width expands). The fact that the degree of elongation DG of the core side region MT1 is large means that stress in the tensile direction is generated on the reel hub 22A side. The stress in the tensile direction contributes to the contraction of the width of the magnetic tape MT. Therefore, with the present configuration, the deformation of the width of the magnetic tape MT is suppressed.

Moreover, in the magnetic tape drive 14 according to the present embodiment, the tension T is applied in accordance with the degree of elongation DG of the magnetic tape MT. Then, the degree of elongation DG is determined in accordance with the longitudinal direction position of the magnetic tape MT. That is, the tension T is applied such that the degree of elongation DG corresponding to the longitudinal direction position is obtained. For example, the fact that the degree of elongation DG is large on the reel hub 22A side means that the stress in the tensile direction is generated on the reel hub 22A side. The stress in the tensile direction contributes to the contraction of the width of the magnetic tape MT. Therefore, with the present configuration, the deformation of the width of the magnetic tape MT is suppressed.

Also, in the magnetic tape drive 14 according to the present embodiment, the degree of elongation DG of the magnetic tape MT is determined in accordance with the rate of change of the tension T with respect to the longitudinal direction position of the magnetic tape MT. Then, the degree of elongation DG is determined in accordance with the longitudinal direction position of the magnetic tape MT. That is, the tension T is applied to the magnetic tape MT such that the degree of elongation DG corresponding to the longitudinal direction position is obtained. Changing the rate of change of the tension T in the longitudinal direction LD of the magnetic tape MT contributes to the optimization of a tension distribution in the longitudinal direction LD of the magnetic tape MT. Therefore, with the present configuration, the deformation of the width of the magnetic tape MT is suppressed.

In addition, in the magnetic tape drive 14 according to the present embodiment, the tension information TI is output by the controller 30A. The tension information TI is used to control of the application of the tension to the magnetic tape MT. Changing the rate of change of the tension T in the longitudinal direction LD of the magnetic tape MT contributes to the optimization of the tension distribution in the longitudinal direction LD of the magnetic tape MT. Therefore, with the present configuration, the deformation of the width of the magnetic tape MT is suppressed.

For example, a case will be considered in which the rate of change of the tension T is regular (for example, a case in which the tension T is always regular). In this case, due to the deformation of the reel hub 22A, a compressive stress is generated in the longitudinal direction LD of the magnetic tape MT on the reel hub 22A side, so that the width of the magnetic tape MT expands on the reel hub 22A side. In addition, as another example, a case will be considered in which the tension T is linearly decreased (that is, the taper tension). In this case, since the radial direction stress σr in the magnetic tape MT wound around the cartridge reel 22 is not taken into consideration, the magnetic tape MT may be loosely wound at a position at which the radial direction stress σr is excessively decreased.

On the other hand, in the present configuration, the rate of change of the tension T applied to the magnetic tape MT is changed in accordance with the longitudinal direction position of the magnetic tape MT. As a result, this change contributes to the optimization of the tension distribution in the longitudinal direction LD of the magnetic tape MT. Therefore, with the present configuration, the deformation of the width of the magnetic tape MT is suppressed.

In addition, in the magnetic tape drive 14 according to the present embodiment, the degree of elongation DG in the magnetic tape MT is changed, and the tension T corresponding to the changed degree of elongation DG is applied to the magnetic tape MT. That is, the tension T is applied such that the degree of elongation DG corresponding to the longitudinal direction position is obtained. For example, the fact that the degree of elongation is large on the reel hub 22A side means that the stress in the tensile direction is generated on the reel hub 22A side. The stress in the tensile direction contributes to the contraction of the width of the magnetic tape MT. In this way, the tension T is applied to the magnetic tape MT such that the degree of elongation DG corresponding to the longitudinal direction position of the magnetic tape MT is obtained. Therefore, with the present configuration, the deformation of the width of the magnetic tape MT is suppressed.

In addition, in the magnetic tape drive 14 according to the present embodiment, the rate of change of the tension T with respect to the longitudinal direction position of the magnetic tape MT is changed in accordance with the longitudinal direction position of the magnetic tape MT. This change contributes to the optimization of the tension distribution in the longitudinal direction LD of the magnetic tape MT. Therefore, with the present configuration, the deformation of the width of the magnetic tape MT is suppressed.

In addition, in the magnetic tape drive 14 according to the present embodiment, in the magnetic tape MT, in the core side region MT1 influenced by the expansion of the width, the rate of change of the tension T is set to be larger than that in the outer peripheral side region MT2. As a result, in the core side region MT1, the elongation is generated in the longitudinal direction LD of the magnetic tape MT. The generation of the elongation in the longitudinal direction LD in the core side region MT1 means that the stress in the tensile direction is generated on the reel hub 22A side. The stress in the tensile direction contributes to the contraction of the width of the magnetic tape MT. Therefore, with the present configuration, the deformation of the width of the magnetic tape MT is suppressed.

In addition, in the magnetic tape drive 14 according to the present embodiment, the degree of elongation DG of the magnetic tape MT is non-linearly changed in accordance with the longitudinal direction position of the magnetic tape MT. This change contributes to the optimization of the tension distribution in the longitudinal direction LD of the magnetic tape MT. As a result, the width change of the magnetic tape MT on the reel hub 22A side in a case in which the magnetic tape MT is wound is suppressed. Therefore, with the present configuration, the deformation of the width of the magnetic tape MT is suppressed.

For example, a case will be considered in which the tension is linearly decreased (that is, is regarded as the taper tension) in accordance with the longitudinal direction position of the magnetic tape MT. In this case, since the radial direction stress σr in the magnetic tape MT wound around the cartridge reel 22 is not taken into consideration, the magnetic tape MT may be loosely wound at the position at which the radial direction stress σr is excessively decreased. Further, in a case of the taper tension, the width of the magnetic tape MT expands in the core side region MT1. The reason is that, since the circumferential direction stress σθ of the magnetic tape MT is relatively shifted in a compression direction on the reel hub 22A side, the radial direction stress σr on the reel hub 22A side is large.

In the present configuration, the rate of change of the tension T is non-linearly decreased in accordance with the longitudinal direction position of the magnetic tape MT, which contributes to the optimization of the tension distribution in the longitudinal direction LD of the magnetic tape MT. As a result, the width change of the magnetic tape MT on the reel hub 22A side in a case in which the magnetic tape MT is wound is suppressed. Therefore, with the present configuration, the deformation of the width of the magnetic tape MT is suppressed.

First Modification Example

In the first embodiment, the form example has been described in which the degree of elongation DG in the magnetic tape MT is obtained from the average value of the intervals d between the servo patterns 58, and further the tension information TI is generated based on the degree of elongation DG, but the technology of the present disclosure is not limited to this. In the first modification example, the tension information TI is stored in advance in the storage 32 of the magnetic tape drive 14.

Figure 20:
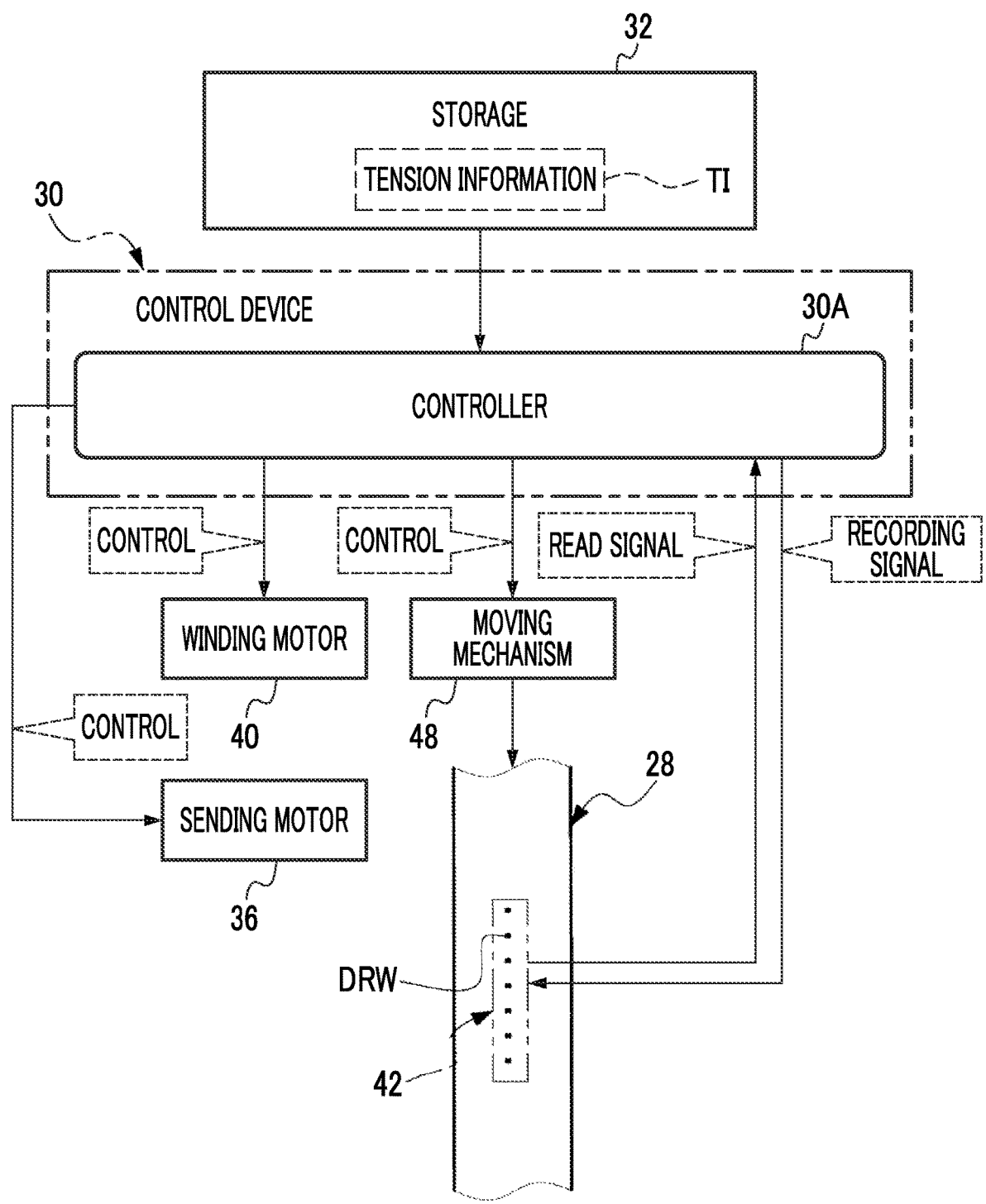
FIG. 20 is a conceptual diagram showing an example of a processing content of a controller provided in a control device provided in a magnetic tape drive according to a first modification example.

As an example, as shown in FIG. 20, the tension information TI is stored in advance in the storage 32. The controller 30A acquires the tension information TI from the storage 32. The controller 30A changes the tension applied to the magnetic tape MT in accordance with the tension condition indicated by the tension information TI. Specifically, the controller 30A changes the rate of change of the tension with respect to the longitudinal direction position of the magnetic tape MT in accordance with the longitudinal direction position of the magnetic tape MT. That is, the controller 30A applies the tension to the magnetic tape MT by adjusting the rotation speed, the rotation torque, and the like of each of the sending motor 36 and the winding motor 40. In addition, the controller 30A controls the tension applied to the magnetic tape MT by adjusting the rotation speed, the rotation torque, and the like of each of the sending motor 36 and the winding motor 40.

It should be noted that, here, although the form example has been described in which the tension information TI is stored in the storage 32, the technology of the present disclosure is not limited to this. The tension information TI may be stored in the cartridge memory 24 instead of the storage 32 or together with the storage 32. In addition, the tension information TI may be recorded in the EOT region MT3 (see FIG. 14) provided at the beginning of the magnetic tape MT and/or in the BOT region MT4 (see FIG. 14) provided at the end of the magnetic tape MT. Further, the tension information TI may be stored in advance in the external device 37 (see FIG. 3) and acquired via the communication interface 35 (see FIG. 3).

As described above, in the magnetic tape drive 14 according to the first modification example, the tension information TI stored in advance in the storage 32 is acquired by the controller 30A, and the tension information TI is output from the controller 30A. The tension information TI is used to control of the application of the tension to the magnetic tape MT. Changing the rate of change of the tension T in the longitudinal direction LD of the magnetic tape MT contributes to the optimization of the tension distribution in the longitudinal direction LD of the magnetic tape MT. Therefore, with the present configuration, the deformation of the width of the magnetic tape MT is suppressed.

Second Modification Example

In the first embodiment described above, the form example has been described in which, in the magnetic tape drive 14, the degree of elongation DG in the core side region MT1 in the magnetic tape MT is equal to or larger than the degree of elongation DG in the outer peripheral side region MT2, but the technology of the present disclosure is not limited to this. In the second modification example, the degree of elongation DG in the core side region MT1 of the magnetic tape MT is larger after the magnetic processing is performed on the magnetic tape MT than before the magnetic processing is performed.

Figure 21:
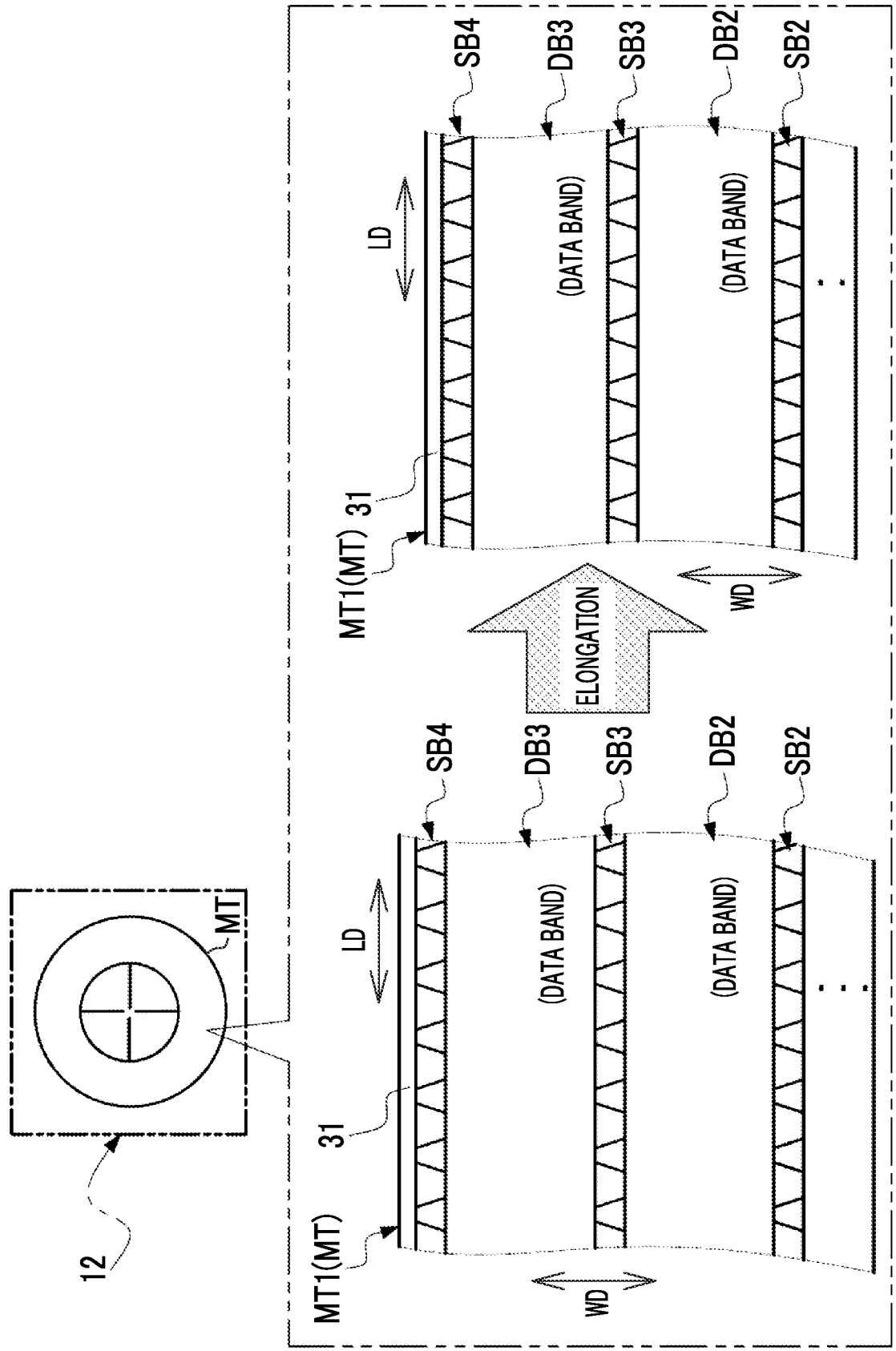
FIG. 21 is a conceptual diagram showing an example of an aspect in which elongation occurs before and after magnetic processing is performed on a magnetic tape according to a second modification example.

As shown in FIG. 21 as an example, in the magnetic tape drive 14, after the magnetic processing is performed on the magnetic tape MT, the magnetic tape MT is wound around the cartridge reel 22 under the tension condition according to the present embodiment. The magnetic tape MT is accommodated in the magnetic tape cartridge 12 in a state in which the magnetic tape MT is wound around the cartridge reel 22. Before and after the magnetic processing is performed on the magnetic tape MT, the elongation of the core side region MT1 is generated. The degree of elongation DG in the core side region MT1 of the magnetic tape MT is larger after the magnetic processing is performed on the magnetic tape MT than before the magnetic processing is performed.

As described above, in the magnetic tape cartridge 12 according to the present embodiment, the load accompanied by the fastening is applied to the cartridge reel 22 from the magnetic tape MT by winding the magnetic tape MT around the cartridge reel 22. As a result, since the reel hub 22A contracts and is deformed, the stress in the direction of the contraction is also generated in the magnetic tape MT in the longitudinal direction LD. Then, the width of the magnetic tape MT is changed (that is, the width expands). In the magnetic tape MT according to the present embodiment, in the core side region MT1 influenced by the expansion of the width, the degree of elongation DG in the longitudinal direction LD of the magnetic tape MT is larger after the magnetic processing (for example, recording and/or reproduction of the data in the magnetic tape MT) is performed on the magnetic tape MT than before the magnetic processing is performed. The fact that the degree of elongation DG of the longitudinal direction LD in the core side region MT1 after the magnetic processing is large means that the stress in the tensile direction is generated on the reel hub 22A side. The stress in the tensile direction contributes to the contraction of the width of the magnetic tape MT. Therefore, with the present configuration, the deformation of the width of the magnetic tape MT is suppressed.

Third Modification Example

Figure 22:
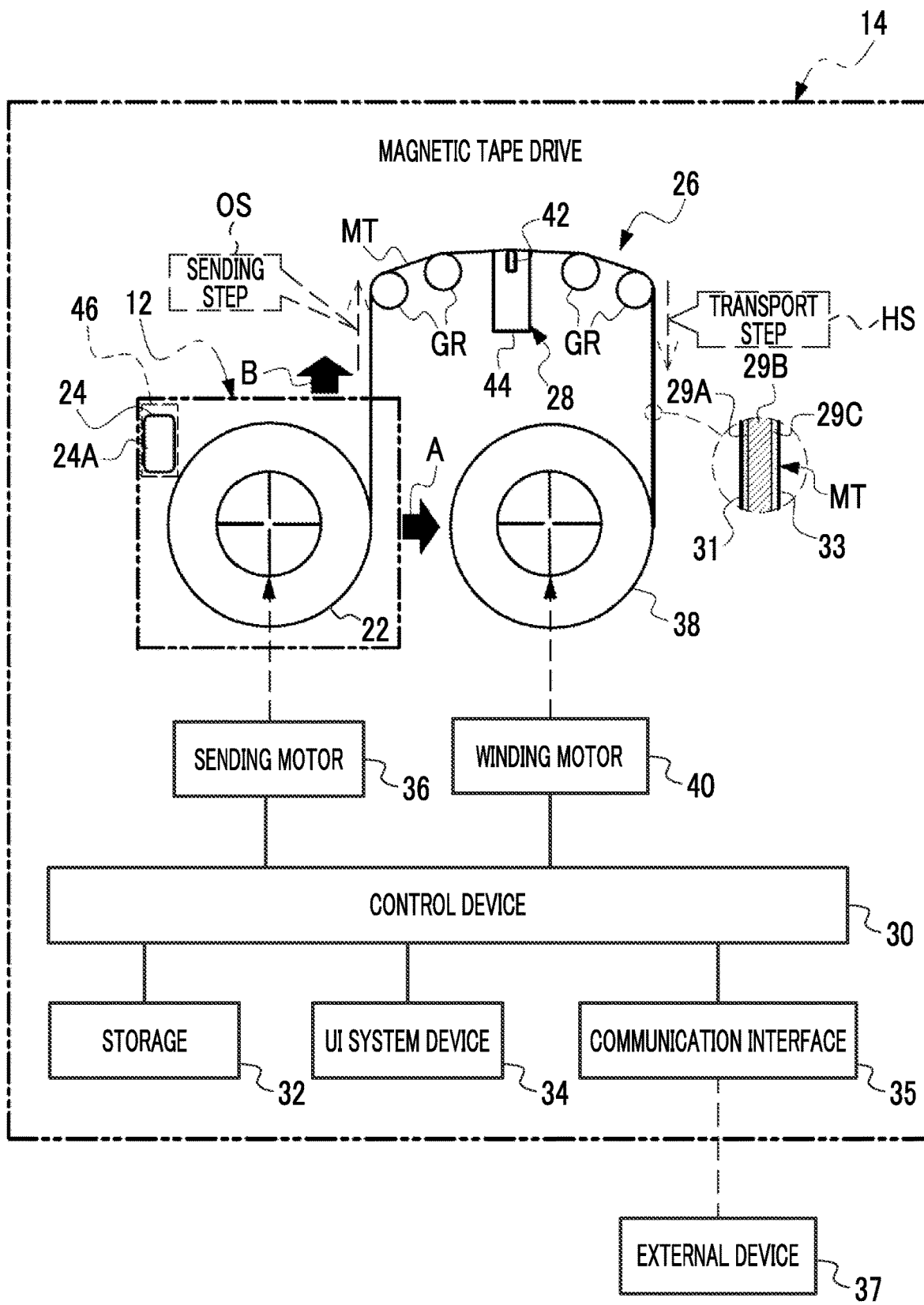
FIG. 22 is a schematic configuration diagram showing an example of a hardware configuration of a magnetic tape drive according to a third modification example.

In addition, in the first embodiment described above, the form example has been described in which the tension control is performed by using the tension information TI in a case in which the magnetic tape MT is wound around the cartridge reel 22, but the technology of the present disclosure is not limited to this. As an example, as shown in FIG. 22, the tension control using the tension information TI is also applied to a sending step OS, which is a step of sending the magnetic tape MT from the cartridge reel 22, and a transport step HS, which is a step of transporting the magnetic tape MT in the magnetic tape drive 14. The sending step OS and the transport step HS are examples of a "method of handling a magnetic tape" according to the technology of the present disclosure.

In this case, the magnetic tape MT is sent from the cartridge reel 22 based on the displacement of the tension indicated by the tension information TI used in a case of winding the magnetic tape MT around the cartridge reel 22. Specifically, the tension information TI used in a case in which the magnetic tape MT is wound around the cartridge reel 22 is stored in advance in the cartridge memory 24. The control device 30 acquires the tension information TI from the cartridge memory 24 via the noncontact read device 46. The control device 30 controls the tension applied to the magnetic tape MT in the sending step OS by using the acquired tension information TI.

Moreover, the control device 30 acquires the tension information TI from the cartridge memory 24 via the noncontact read device 46. The control device 30 controls the tension T applied to the magnetic tape MT in the transport step HS by using the acquired tension information TI.

As described above, in the third modification example, the tension control using the tension information TI is applied in the sending step OS. In a case in which the magnetic tape MT is wound around the cartridge reel 22, the tension T applied to the magnetic tape MT causes the elongation in the core side region MT1 of the magnetic tape MT. The elongation in the longitudinal direction LD in the core side region MT1 means that the stress in the tensile direction is generated on the reel hub 22A side. The stress in the tensile direction contributes to the contraction of the width of the magnetic tape MT. In the present modification example, the magnetic tape MT is sent from the cartridge reel 22 based on the displacement of the tension T in a case in which the magnetic tape MT is wound around the cartridge reel 22. Accordingly, in a case in which the magnetic tape MT is sent from the cartridge reel 22, it is possible to reduce the influence on the elongation caused in the magnetic tape MT. Therefore, with the present configuration, the deformation of the width of the magnetic tape MT is suppressed.

Also, in the third modification example, the tension control using the tension information TI is applied to the transport step HS. In a case in which the magnetic tape MT is wound around the cartridge reel 22, the tension T applied to the magnetic tape MT causes the elongation in the core side region MT1 of the magnetic tape MT. The elongation in the longitudinal direction LD in the core side region MT1 means that the stress in the tensile direction is generated on the reel hub 22A side. The stress in the tensile direction contributes to the contraction of the width of the magnetic tape MT. In the third modification example, in a case in which the magnetic tape MT is transported in the magnetic tape drive 14, the control using the tension information TI is performed. Accordingly, it is possible to reduce the influence on the elongation generated in the magnetic tape MT. Therefore, with the present configuration, the deformation of the width of the magnetic tape MT is suppressed.

Fourth Modification Example

In the first embodiment described above, the form example has been described in which the tension control using the tension information TI is used for the magnetic tape MT at a stage in which the magnetic tape MT is used in the magnetic tape drive 14, but the technology of the present disclosure is not limited to this. In the fourth modification example, the tension control using the tension information TI may be used for the magnetic tape MT at a manufacturing stage of the magnetic tape MT.

Figure 23:
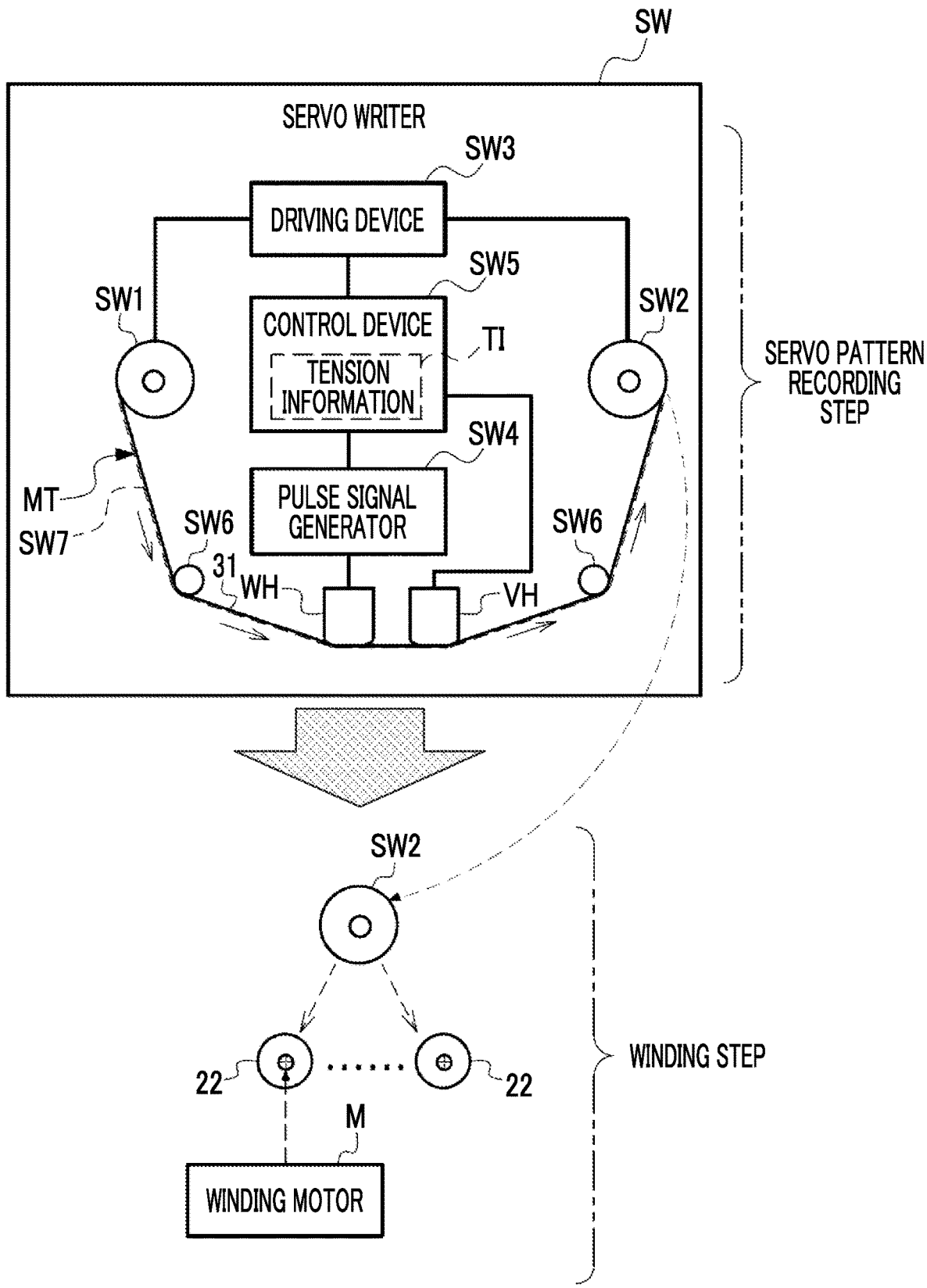
FIG. 23 is a conceptual diagram showing an example of a configuration of a servo writer according to a fourth modification example.

As shown in FIG. 23 as an example, among a plurality of steps included in a manufacturing process of the magnetic tape MT, an example of a servo pattern recording step of recording the servo pattern 58 on the servo band SB of the magnetic tape MT and an example of a winding step of winding the magnetic tape MT will be described. In the present embodiment, the winding step is an example of the "method of handling a magnetic tape" according to the technology of the present disclosure.

In the servo pattern recording step, a servo writer SW is used. The servo writer SW comprises a sending reel SW1, a winding reel SW2, a driving device SW3, a pulse signal generator SW4, a control device SW5, a plurality of guides SW6, a transport passage SW7, a servo pattern recording head WH, and a verification head VH.

The control device SW5 controls the entire servo writer SW. In the present embodiment, although the control device SW5 is realized by an ASIC, the technology of the present disclosure is not limited to this. For example, the control device SW5 may be realized by an FPGA and/or a PLC. In addition, the control device SW5 may be realized by the computer including a CPU, a flash memory (for example, an EEPROM and/or an SSD), and a RAM. In addition, the control device 30 may be realized by combining two or more of an ASIC, an FPGA, a PLC, and a computer. That is, the control device SW5 may be realized by a combination of a hardware configuration and a software configuration.

A pancake is set in the sending reel SW1. The pancake refers to a large-diameter roll in which the magnetic tape MT cut into a product width from a wide web raw material before writing the servo pattern 58 is wound around a hub.

The driving device SW3 has a motor (not shown) and a gear (not shown), and is mechanically connected to the sending reel SW1 and the winding reel SW2. In a case in which the magnetic tape MT is wound by the winding reel SW2, the driving device SW3 generates power in accordance with the command from the control device SW5, and transmits the generated power to the sending reel SW1 and the winding reel SW2 to rotate the sending reel SW1 and the winding reel SW2. That is, the sending reel SW1 receives the power from the driving device SW3 and is rotated to send the magnetic tape MT to the predetermined transport passage SW7. The winding reel SW2 receives the power from the driving device SW3 and is rotated to wind the magnetic tape MT sent from the sending reel SW1. The rotation speed, the rotation torque, and the like of the sending reel SW1 and the winding reel SW2 are adjusted in accordance with a speed at which the magnetic tape MT is wound around the winding reel SW2.

In this case, the control device SW5 controls the tension applied to the magnetic tape MT by using the tension information TI. Specifically, the control device SW5 controls the tension T applied to the magnetic tape MT by controlling the rotation speed, the rotation torque, and the like of the sending reel SW1 and the winding reel SW2.

The pulse signal generator SW4 generates the pulse current under the control of the control device SW5, and supplies the generated pulse current to the servo pattern recording head WH. In a state in which the magnetic tape MT travels on the transport passage SW7 at a regular speed, the servo pattern recording head WH records the servo pattern 58 in the servo band SB in response to the pulse current supplied from the pulse signal generator SW4.

The plurality of guides SW6 and the servo pattern recording head WH are disposed on the transport passage SW7. The servo pattern recording head WH is disposed on the front surface 31 side of the magnetic tape MT between the plurality of guides SW6. The magnetic tape MT sent from the sending reel SW1 to the transport passage SW7 is guided by the plurality of guides SW6 and is wound by the winding reel SW2 via the servo pattern recording head WH.

The manufacturing process of the magnetic tape MT includes a plurality of steps in addition to the servo pattern recording step. The plurality of steps include the inspection step and the winding step.

For example, the inspection step is a step of inspecting the servo band SB formed on the front surface 31 of the magnetic tape MT by the servo pattern recording head WH. The inspection of the servo band SB refers to, for example, processing of determining the correctness of the servo pattern 58 recorded in the servo band SB. The determination of the correctness of the servo pattern 58 refers to, for example, the determination (that is, verification of the servo pattern 58) whether or not the servo patterns 58A and 58B are recorded in a predetermined portion of the front surface 31 without excess or deficiency of the magnetization straight lines 60A1$a$, 60A2$a$, 60B1$a$, and 60B2$a$ and within an allowable error.

The inspection step is performed by using the control device SW5 and the verification head VH. The verification head VH is disposed on the downstream side of the servo pattern recording head WH in a transport direction of the magnetic tape MT. In addition, the verification head VH includes a plurality of servo reading elements (not shown) similarly to the magnetic head 28, and the plurality of servo bands SB are read by the plurality of servo reading elements.

The verification head VH is connected to the control device SW5. The verification head VH is disposed at a position facing the servo band SB as viewed from the front surface 31 side of the magnetic tape MT (that is, the rear surface side of the verification head VH), and reads the servo pattern 58 recorded in the servo band SB, and outputs a reading result (hereinafter, referred to as "servo pattern reading result") to the control device SW5. The control device SW5 inspects the servo band SB (for example, determines the correctness of the servo pattern 58) based on the servo pattern reading result (for example, the servo signal) input from the verification head VH. For example, the control device SW5 inspects the servo band SB by acquiring the position detection result from the servo pattern reading result and determining the correctness of the servo pattern 58 by using the position detection result.

The control device SW5 outputs information indicating the result of inspecting the servo band SB (for example, the result of determining the correctness of the servo pattern 58) to a predetermined output destination (for example, the storage 32 (see FIG. 3), the UI system device 34 (see FIG. 3), and/or the external device 37 (see FIG. 3)).

For example, in a case in which the inspection step is terminated, the winding step is then performed. The winding step is a step of winding the magnetic tape MT around the cartridge reel 22 (that is, the cartridge reel 22 (see FIG. 2) accommodated in the magnetic tape cartridge 12 (see FIG. 2)) used for each of the plurality of magnetic tape cartridges 12 (see FIG. 2). In the winding step, a winding motor M is used. The winding motor M is mechanically connected to the cartridge reel 22 via a gear and the like. The winding motor M rotates the cartridge reel 22 by applying a rotation force to the cartridge reel 22 under the control of the control device (not shown). The magnetic tape MT wound around the winding reel SW2 is wound around the cartridge reel 22 by the rotation of the cartridge reel 22. In the winding step, a cutting device (not shown) is used. In a case in which a required amount of the magnetic tape MT is wound around the cartridge reel 22 for each of the plurality of cartridge reels 22, the magnetic tape MT sent from the winding reel SW2 to the cartridge reel 22 is cut by the cutting device.

In the embodiment described above, the magnetic tape system 10 has been described in which the magnetic tape cartridge 12 can be inserted and removed with respect to the magnetic tape drive 14, but the technology of the present disclosure is not limited to this. For example, even in a case of the magnetic tape system in which at least one magnetic tape cartridge 12 is loaded in advance into the magnetic tape drive 14 (that is, the magnetic tape system in which at least one magnetic tape cartridge 12 and the magnetic tape drive 14 are integrated in advance), the technology of the present disclosure is established.

In addition, in the embodiment described above, the form example has been described in which the tension control process program 74 is stored in the NVM 72, but the technology of the present disclosure is not limited to this. For example, the tension control process program 74 may be stored in a portable storage medium, such as an SSD or a USB memory. The storage medium is a non-transitory computer-readable storage medium. The tension control process program 74, which is stored in the storage medium, is installed in the computer of the control device 30. The processor 68 executes the tension control process in accordance with the tension control process program 74.

The above described contents and shown contents are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. As a result, it is needless to say that unnecessary parts may be deleted, new elements may be added, or replacements may be made with respect to the above described contents and shown contents within a range that does not deviate from the gist of the technology of the present disclosure. In addition, in order to avoid complications and facilitate understanding of the parts according to the technology of the present disclosure, in the above described contents and shown contents, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B.

In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

In addition to the embodiment described above, the following supplementary notes will be disclosed.

Supplementary Note 1

A magnetic tape cartridge comprising a magnetic tape wound around a reel, in which the magnetic tape has a first region, which is a predetermined region influenced by a width change of the magnetic tape accompanied by deformation of the reel due to winding of the magnetic tape, and a second region, which is a region on an outer peripheral side of the reel with respect to the first region, and regarding a degree of elongation in a longitudinal direction of the magnetic tape, the degree of the first region is equal to or larger than the degree of the second region.

Supplementary Note 2

The magnetic tape cartridge according to Supplementary Note 1, in which the second region includes an intermediate region in the longitudinal direction of the magnetic tape.

Supplementary Note 3

The magnetic tape cartridge according to Supplementary Note 1 or 2, in which a plurality of servo patterns are formed in the magnetic tape in the longitudinal direction, and the degree is obtained based on a first interval, which is an interval between the servo patterns adjacent to each other in the longitudinal direction of the magnetic tape in the first region, and a second interval, which is an interval between the servo patterns adjacent to each other in the longitudinal direction of the magnetic tape in the second region.

Supplementary Note 4

The magnetic tape cartridge according to Supplementary Note 3, in which a value of the first interval is a statistic value of the intervals between the servo patterns adjacent to each other in the longitudinal direction of the magnetic tape in the first region.

Supplementary Note 5

The magnetic tape cartridge according to Supplementary Note 3 or 4, in which a value of the second interval is a statistic value of the intervals between the servo patterns adjacent to each other in the longitudinal direction of the magnetic tape in the second region.

Supplementary Note 6

A magnetic tape cartridge comprising a magnetic tape wound around a reel, in which the magnetic tape has a first region, which is a predetermined region influenced by a width change of the magnetic tape accompanied by deformation of the reel due to winding of the magnetic tape, and a degree of elongation in a longitudinal direction of the magnetic tape in the first region is larger after magnetic processing is performed on the magnetic tape than before the magnetic processing is performed.

Supplementary Note 7

A magnetic tape drive comprising a processor, and a tension application mechanism, in which the processor causes the tension application mechanism to apply a tension to the magnetic tape provided in the magnetic tape cartridge according to any one of Supplementary Notes 1 to 6, and the tension is determined in accordance with the degree.

Supplementary Note 8

The magnetic tape drive according to Supplementary Note 7, in which the degree is determined in accordance with a longitudinal direction position of the magnetic tape.

Supplementary Note 9

The magnetic tape drive according to Supplementary Note 8, in which the degree is determined in accordance with a rate of change of the tension with respect to the longitudinal direction position of the magnetic tape.

Supplementary Note 10

The magnetic tape drive according to Supplementary Note 7, in which the processor acquires tension information related to the tension applied to the magnetic tape, and outputs the acquired tension information, and the tension information is information for changing a rate of change of the tension with respect to a longitudinal direction position of the magnetic tape in accordance with the longitudinal direction position of the magnetic tape.

Supplementary Note 11

A tension control method of applying a tension to the magnetic tape provided in the magnetic tape cartridge according to any one of Supplementary Notes 1 to 6, the method comprising changing the degree, and applying a tension corresponding to the changed degree to the magnetic tape.

Supplementary Note 12

The tension control method according to Supplementary Note 11, further comprising changing a rate of change of the tension with respect to a longitudinal direction position of the magnetic tape in accordance with the longitudinal direction position of the magnetic tape.

Supplementary Note 13

The tension control method according to Supplementary Note 11 or 12, in which the magnetic tape has a first region, which is a predetermined region influenced by a width change of the magnetic tape accompanied by deformation of the reel due to winding of the magnetic tape, and a second region, which is a region on an outer peripheral side of the reel with respect to the first region, and the rate of change in the first region is larger than the rate of change in the second region.

Supplementary Note 14

The tension control method according to any one of Supplementary Notes 11 to 13, in which the degree is non-linearly decreased from a core side to an outer peripheral side of the reel.

Supplementary Note 15

A method of handling a magnetic tape, the method comprising applying the tension to the magnetic tape in accordance with the tension control method according to any one of Supplementary Notes 11 to 14, and winding the magnetic tape to which the tension is applied around a reel.

Supplementary Note 16

The method of handling a magnetic tape according to Supplementary Note 15, the method further comprising sending the magnetic tape based on displacement of the tension used in a case in which the magnetic tape is wound around the reel.

Supplementary Note 17

A method of handling a magnetic tape, the method comprising transporting the magnetic tape in accordance with the tension control method according to any one of Supplementary Notes 11 to 14.

Supplementary Note 18

A program causing a computer to execute a process, which is a tension control process of applying a tension to the magnetic tape provided in the magnetic tape cartridge according to any one of Supplementary Notes 1 to 6, the tension control process comprising changing the degree, and applying a tension corresponding to the changed degree to the magnetic tape.

What is claimed is:

1. A magnetic tape cartridge comprising:
a magnetic tape wound around a reel,
wherein the magnetic tape has a first region, which is a predetermined region influenced by a width change of the magnetic tape accompanied by deformation of the reel due to winding of the magnetic tape, and a second region, which is a region on an outer peripheral side of the reel with respect to the first region, and
regarding a degree of elongation in a longitudinal direction of the magnetic tape, the degree of elongation of the first region is larger than the degree of elongation of the second region,
wherein regarding a tension in the magnetic tape wound around the reel, the tension decreases from an inner side toward an outer side of the reel, and a decrease rate of the tension at the first region of the magnetic tape is larger than a decrease rate of the tension at the second region of the magnetic tape, such that the degree of elongation of the first region of the magnetic tape is larger than the degree of elongation of the second region of the magnetic tape.

2. The magnetic tape cartridge according to claim 1, wherein the second region includes an intermediate region in the longitudinal direction of the magnetic tape.

3. The magnetic tape cartridge according to claim 1, wherein a plurality of servo patterns are formed in the magnetic tape in the longitudinal direction, and
the degree of elongation is obtained based on a first interval, which is an interval between the servo patterns adjacent to each other in the longitudinal direction of the magnetic tape in the first region, and a second interval, which is an interval between the servo patterns adjacent to each other in the longitudinal direction of the magnetic tape in the second region.

4. The magnetic tape cartridge according to claim 3, wherein a value of the first interval is a statistic value of the intervals between the servo patterns adjacent to each other in the longitudinal direction of the magnetic tape in the first region.

5. The magnetic tape cartridge according to claim 3, wherein a value of the second interval is a statistic value of the intervals between the servo patterns adjacent to each other in the longitudinal direction of the magnetic tape in the second region.

6. A magnetic tape drive comprising:
a processor; and
a tension application mechanism,
wherein the processor is configured to cause the tension application mechanism to apply a tension to the magnetic tape provided in the magnetic tape cartridge according to claim 1, and
the tension is determined in accordance with the degree of elongation.

7. The magnetic tape drive according to claim 6, wherein the degree of elongation is determined in accordance with a longitudinal direction position of the magnetic tape.

8. The magnetic tape drive according to claim 7, wherein the degree of elongation is determined in accordance with a rate of change of the tension with respect to the longitudinal direction position of the magnetic tape.

9. The magnetic tape drive according to claim 6, wherein the processor is configured to
acquire tension information related to the tension applied to the magnetic tape, and
output the acquired tension information, and
the tension information is information for changing a rate of change of the tension with respect to a longitudinal direction position of the magnetic tape in accordance with the longitudinal direction position of the magnetic tape.

10. A tension control method of applying a tension to the magnetic tape provided in the magnetic tape cartridge according to claim 1, the method comprising:
changing the degree of elongation; and
applying a tension corresponding to the changed degree to the magnetic tape.

11. The tension control method according to claim 10, further comprising:
changing a rate of change of the tension with respect to a longitudinal direction position of the magnetic tape in accordance with the longitudinal direction position of the magnetic tape.

12. The tension control method according to claim 10, wherein the degree of elongation is non-linearly decreased from a core side to the outer peripheral side of the reel.

13. A method of handling a magnetic tape, the method comprising:
applying the tension to the magnetic tape in accordance with the tension control method according to claim 10; and
winding the magnetic tape to which the tension is applied around the reel.

14. The method of handling a magnetic tape according to claim 13, the method further comprising:
sending the magnetic tape based on displacement of the tension used in a case in which the magnetic tape is wound around the reel.

15. A method of handling a magnetic tape, the method comprising:
transporting the magnetic tape in accordance with the tension control method according to claim 10.

16. A non-transitory storage medium storing a program causing a computer to execute a process, which is a tension control process of applying a tension to the magnetic tape provided in the magnetic tape cartridge according to claim 1, the tension control process comprising:
changing the degree of elongation; and
applying a tension corresponding to the changed degree of elongation to the magnetic tape.

* * * * *